(12) United States Patent
Leberl et al.

(10) Patent No.: US 7,859,572 B2
(45) Date of Patent: Dec. 28, 2010

(54) ENHANCING DIGITAL IMAGES USING SECONDARY OPTICAL SYSTEMS

(75) Inventors: Franz Leberl, Boulder, CO (US); Michael Gruber, Graz (AT); Martin Ponticelli, Graz (AT)

(73) Assignee: Microsoft Corporation, Redmond, WA (US)

( * ) Notice: Subject to any disclaimer, the term of this patent is extended or adjusted under 35 U.S.C. 154(b) by 686 days.

(21) Appl. No.: 11/834,459

(22) Filed: Aug. 6, 2007

(65) Prior Publication Data

US 2009/0040322 A1 Feb. 12, 2009

(51) Int. Cl.
*H04N 5/225* (2006.01)
*H04N 7/18* (2006.01)

(52) U.S. Cl. .................... 348/218.1; 348/144

(58) Field of Classification Search .............. 348/218.1, 348/262–265, 144
See application file for complete search history.

(56) References Cited

U.S. PATENT DOCUMENTS

| | | | |
|---|---|---|---|
| 4,663,656 A | 5/1987 | Elabd | |
| 5,130,845 A | 7/1992 | Ruben | |
| 5,206,918 A | 4/1993 | Levene | |
| 5,532,737 A | 7/1996 | Braun | |
| 5,581,409 A * | 12/1996 | Ruben | 359/636 |
| 5,686,960 A | 11/1997 | Sussman | |
| 5,732,292 A | 3/1998 | Yaji | |
| 5,790,188 A | 8/1998 | Sun | |
| 5,867,318 A * | 2/1999 | Cordier et al. | 359/618 |
| 5,946,509 A | 8/1999 | Morton | |
| 5,999,650 A | 12/1999 | Ligon | |
| 6,356,646 B1 | 3/2002 | Spencer | |
| 6,597,807 B1 | 7/2003 | Watkins | |
| 6,611,289 B1 | 8/2003 | Yu | |
| 6,643,457 B2 | 11/2003 | Chen | |

(Continued)

FOREIGN PATENT DOCUMENTS

WO WO2007016718 A1 2/2007

OTHER PUBLICATIONS

QuickBird Satellite; http://www.eurimage.com/products/quickbird.html, cited Apr. 23, 2007.

(Continued)

*Primary Examiner*—David L Ometz
*Assistant Examiner*—Dillon Durnford-Geszvain
(74) *Attorney, Agent, or Firm*—Shook Hardy & Bacon LLP

(57) ABSTRACT

Apparatuses and methods for enhancing a "primary" large format, digital, macro-image with "secondary" image data are provided. The secondary image data is collected utilizing one or more secondary optical systems having at least one electro-optical detector array (e.g., a CCD array) and a specific set of optical mirrors or optical prisms, arranged in such a way that the secondary optical systems extend the angular angle-of-view of the primary optical system and the resultant digital image in at least two opposing directions, for instance, in the left and right and/or fore and aft directions. The primary image data and the secondary image data may be distinct and/or may include portions that overlap with one another. Further, the primary image data and the secondary image data may be collected at the same or different resolutions. The collected primary image data and secondary image data are utilized to generate a single output image.

20 Claims, 16 Drawing Sheets

U.S. PATENT DOCUMENTS

| | | | |
|---|---|---|---|
| 6,804,406 | B1 | 10/2004 | Chen |
| 6,885,509 | B2 * | 4/2005 | Wallerstein et al. .......... 359/725 |
| 7,009,638 | B2 | 3/2006 | Gruber et al. |
| 7,084,904 | B2 | 8/2006 | Liu |
| 7,095,420 | B2 | 8/2006 | Burky |
| 7,206,136 | B2 | 4/2007 | Labaziewicz |
| 7,215,362 | B2 | 5/2007 | Klose |
| 7,528,864 | B2 * | 5/2009 | Sassa ...................... 348/218.1 |
| 2001/0015847 | A1 * | 8/2001 | Sugawara ................... 359/462 |
| 2006/0268130 | A1 | 11/2006 | Williams |
| 2006/0275025 | A1 | 12/2006 | Labaziewicz |
| 2007/0024701 | A1 | 2/2007 | Prechtl |
| 2007/0076099 | A1 * | 4/2007 | Eshed et al. ............. 348/218.1 |
| 2007/0090295 | A1 | 4/2007 | Parkinson |

OTHER PUBLICATIONS

L. Markelin, E. Ahokas, E. Honkavaara, A. Kukko, J. Peltoniemi, "Radiometric Quallity Comparison of Ultracam-D and Analog Camera", http://www.ipi.uni-hannover.de/html/publikationen/2005/workshop/099-markelin.pdf.

Image Sensors, http://www.photozone.de/3Technology/digital_3.htm, cited Apr. 23, 2007.

The New Research Line of Large Format, Dual Head Triple Sensor, Self-Guiding CCD Cameras from SBIG, http:www.sbig.com/sbwhtmls/large_format_cameras.htm, cited Apr. 19, 2007.

Lin, Shih-Schon, Bajcsy, R, "High Resolution Catadioptric Omni-Directional Stereo Sensor for Robot Vision", http://ieeexplore.ieee.org/Xplore/login.jsp?url=iel5/8794/27834/01241838.pdf, cited Apr. 19, 2007.

Szeliski, Richard, Heung-Yeung, Shum, "Creating Full View Panoramic Image Mosaics and Environment Maps", Microsoft Research, http://delivery.acm.org/10.1145/260000/258861/p251-szeliski.pdf?key1=258861&key2=6553986711&coll=GUIDE&dl=GUIDE&CFID=16747216&CFTOKEN=20972248.

Reulke, Ralf, "Film-based and Digital Sensors—Augmentation or Change in Paradigm?", http://www.ifp.uni-stuttgart.de/publications/phowo03/reulke.pdf.

Litvinov, Anatoly, Schechner, Yoav, "Radiometric Framework for Image Mosaicking", http://www.ee.technion.ac.il/'yoav/publications/Mosaicking_JOSA.pdf.

* cited by examiner

ENHANCING DIGITAL IMAGES USING SECONDARY OPTICAL SYSTEMS

BACKGROUND

Large-format digital macro-images may be obtained utilizing a single large optical system or utilizing multiple optical systems having parallel optical axes. Not only are large optical systems costly and difficult to manage, the distance at which one must position the system in order to view a large object and/or expansive terrain renders the resultant digital image an image of poor resolution in which little detail typically can be discerned. While multiple optical systems having parallel optical axes may permit the acquisition of an image of a large object and/or expansive terrain with greater resolution, the parallelism results in an optical system with a limited angle-of-view. Thus, the angle-of-view of the resultant digital images is limited as well.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to apparatuses and methods for enhancing a "primary" large format, digital, macro-image utilizing one or more "secondary" optical systems, each secondary optical system having at least one electro-optical detector array (e.g., a charge coupled device (CCD) array) and a specific set of optical mirrors or optical prisms, arranged in such a way that the secondary optical systems extend the angular angle-of-view of the primary optical system. Sub-images produced by the secondary optical system(s) may enhance an image produced by the associated primary optical system in at least two opposing directions, for instance, in the left and right and/or fore and aft directions. In this way, the angle-of-view of the resultant digital image is enhanced beyond the capability of the primary optical system alone.

BRIEF DESCRIPTION OF THE DRAWINGS

The present invention is described in detail below with reference to the attached drawing figures, wherein.

DETAILED DESCRIPTION

Figures 1A, 1B:
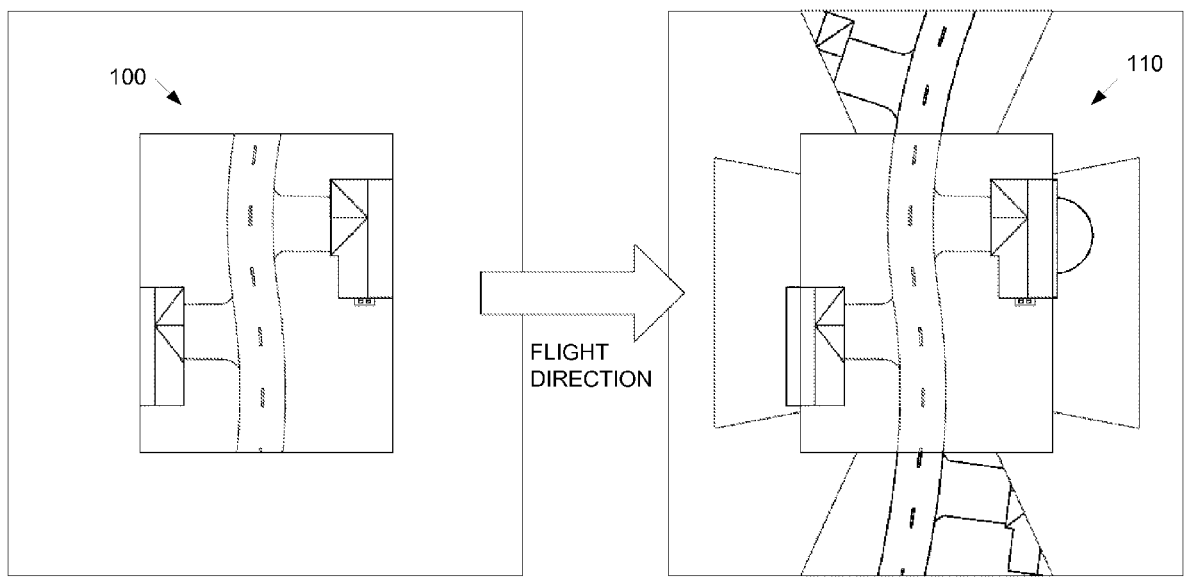
FIGS. 1a and 1b are schematic diagrams illustrating a comparison of non-extended (FIG. 1a) and extended (FIG. 1b) angle-of-view, large-format digital macro-images, the extension of the angle-of-view taking place in multiple directions utilizing one or more secondary optical systems, in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to apparatuses and methods for enhancing a "primary" large format, digital, macro-image utilizing one or more "secondary" optical systems, each secondary optical system having at least one electro-optical detector array (e.g., a charge coupled device (CCD) array) and a specific set of optical mirrors or optical prisms, arranged in such a way that the secondary optical system(s) extend the angular angle-of-view of the primary optical system. Sub-images produced by the secondary optical system(s) may enhance an image produced by the associated primary optical system in at least two opposing directions, e.g., the left and right and/or fore and aft directions. In this way, the angle-of-view of the resultant digital image is enhanced beyond the capability of the primary optical system alone.

Accordingly, in one aspect, the present invention provides a method for enhancing large-format digital images. The method includes receiving primary image data from at least one primary optical system and receiving secondary image data from at least one secondary optical system. The secondary image data includes image data from two disparate regions received substantially simultaneously (i.e., within microseconds) by a single electro-optical detector array. The method further includes arranging the secondary image data with respect to the primary image data such that a angle-of-view of the primary image data is enhanced by the secondary image data.

In another aspect, the present invention provides an apparatus for enhancing large-format digital images. The apparatus includes one or more primary optical systems and one or more secondary optical systems. Each secondary optical system includes one or more electro-optical detector arrays and at least two prisms, the prisms being configured to collect light energy from disparate locations and project the respective collected light energy onto a common electro-optical detector array.

In yet another aspect, the present invention provides an apparatus for enhancing large-format digital images including one or more primary optical systems and one or more secondary optical systems. Each secondary optical system includes one or more electro-optical detector arrays and at least one set of mirrors, at least two of the mirrors being configured to collect light energy from disparate locations and project the respective collected light energy onto a common electro-optical detector array.

In another aspect, the present invention provides a method for enhancing large-format digital images. The method includes receiving primary image data from at least one primary optical system, receiving secondary image data from at least one secondary optical system, and arranging the secondary image data with respect to the primary image data such that a angle-of-view of the primary image is enhanced by the secondary image data. The secondary image data includes image data from two disparate regions received substantially simultaneously (i.e., within microseconds) by a single electro-optical detector array and the secondary image data is filtered through at least one polarization filter.

In yet another aspect, the present invention provides an apparatus for enhancing large-format digital images. The apparatus includes one or more primary optical systems and one or more secondary optical systems. Each secondary optical system includes one or more electro-optical detector arrays, at least two prisms, the at least two prisms being configured to collect light energy from disparate locations and project the respective collected light energy onto a common one of the one or more electro-optical detector arrays, and at least one polarization filter configured to filter the light energy collected by each of the prisms such that light energy from a first of the filters is configured to be projected onto a first region of the electro-optical detector array and light energy from a second of the filters is configured to be projected onto a second region of the electro-optical detector array, the first and second regions of the electro-optical detector array being disparate from one another.

Still further, in another aspect, the present invention provides an apparatus for enhancing large-format digital images. The apparatus comprises one or more primary optical systems and one or more secondary optical systems. Each secondary optical system includes one or more electro-optical detector arrays, at least one set of mirrors, at least two mirrors comprising the set being configured to collect light energy from disparate locations and project the respective collected light energy onto a common electro-optical detector array, and at least one polarization filter configured to filter the light energy collected by each of at least two mirrors such that light energy from a first of the mirrors is configured to be projected onto a first region of the electro-optical detector array and light energy from a second of the mirrors is configured to be projected onto a second region of the electro-optical detector array, the first and second regions of the electro-optical detectors array being disparate from one another.

In yet another aspect, the present invention provides a method for generating large-format color digital images. The method includes receiving image data from a plurality of optical systems, each of the optical systems configured for collecting image data from a different color channel; and generating an image from the received image data. A quantity of colors represented in the generated image is greater than a quantity of optical systems from which image data is received and any color not received from one of the optical systems is calculated utilizing data associated with colors corresponding with each of the different color channels.

Still further, in another aspect, the present invention provides a method for generating large-format color digital images. The method includes receiving image data from a first optical system, the first optical system configured for collecting image data associated with a red color channel; receiving image data from a second optical system, the second optical system configured for collecting image data associated with a blue color channel; receiving image data from a third optical system, the second optical system configured for collecting image data associated with a near-infrared color channel; and calculating image data associated with a green color channel utilizing the image data received from each of the first, second and third optical systems.

In yet another aspect, the present invention provides an apparatus for generating a large-format color digital image. The apparatus comprises a primary optical system configured for collecting panchromatic image data, and a plurality of secondary optical systems, each secondary optical system being configured for collecting image data from a different one of a plurality of color channels, wherein a quantity of the plurality of color channels is less than a quantity of colors represented in the large-format color digital image.

Embodiments of the present invention provide a single camera approach to capturing an image downward and in the sideways directions to produce a geometrically rigid "bundle of optical rays" that is advantageous in photogrammetry. This geometric rigidity is further increased by the use of a single CCD and a single lens for looking at two disparate object regions; that is, an image produced utilizing two CCDs and two lenses would have far less geometric rigidity. Further, the simultaneity of the image taking in all directions provides advantages in the radiometric rigidity of the resultant image. If one were to image vertically in one flight or on one day and then image the sideways views on another day or in another flight, then the radiometry would be unpredictably and unrecoverably different. Still further, embodiments of the present invention provide for filling the compromised (partly empty) format of a single image by an appropriate flight and image trigger pattern, as more fully described below.

Referring to the drawings in general and initially to FIGS. 1a and 1b in particular, wherein like reference numerals identify like components in the various figures, a comparison of non-extended (FIG. 1a) and extended (FIG. 1b) angle-of-view large format, digital, macro-images is illustrated, in accordance with an embodiment of the present invention. The extension of the angle-of-view occurs both in the left and right directions and in the fore and aft directions utilizing at least two secondary optical systems. FIG. 1a shows a primary large format, digital, macro-image 100 provided by a primary optical system (as more fully described herein below). FIG. 1b shows the primary large format, digital, macro-image 100 (FIG. 1a) with both an extended angle-of-view in the left and right directions and an extended angle-of-view in the fore and aft directions, in accordance with embodiments hereof. The extended large format, digital, macro-image is designated in FIG. 1b as reference numeral 110.

Each secondary optical system utilized for extending the angle-of-view of the primary image, in accordance with embodiments hereof, is equipped with a set of optical mirrors or optical prisms arranged in such a way that light from two disparate areas of a large area object (e.g., aerially photographed terrain) is projected through a single lens system onto a single electro-optical detector array (e.g., charge coupled device (CCD) array), as more fully described below. In this way, the angle-of-view of the overall camera system is symmetrically extended along a first diameter of the angle-of-view. In embodiments wherein the overall camera system is utilized for aerial photogrammetric image acquisition and images are taken in a short sequence along a distinct flight line, the first diameter may be oriented parallel to such flight line. Such an increase in the angle-of-view may improve the stereo-geometry of the camera system, increase the redundancy for automated image analysis, and improve the visibility of vertical surfaces (e.g., building facades) without adding any operational effort and/or cost.

In accordance with embodiments hereof, the optical mirrors or optical prisms of a second secondary optical system may be oriented such that the angle-of-view of the overall camera system is extended along a second diameter of the angle-of-view. In one embodiment, the orientation of this extension with respect to the orientation of the extension along the first diameter is perpendicular. In this embodiment, the two extensions may be in the left and right directions (i.e., oblique) as well as in the fore and aft directions, or another similarly-situated arrangement wherein extensions occur in a plurality of opposing directions perpendicular to one another.

Accordingly, in one embodiment, the present invention provides a method for enhancing large-format digital images. The method includes receiving primary image data from at least one primary optical system, receiving secondary image data from at least one secondary optical system, and arranging the secondary image data with respect to the primary image data such that a angle-of-view of the primary image data is enhanced by the secondary image data. The secondary image data includes image data from two disparate regions received substantially simultaneously by a single electro-optical detector array.

In another embodiment, the present invention provides an apparatus for enhancing large-format digital images. The apparatus includes one or more primary optical systems and one or more secondary optical systems. Each secondary optical system includes one or more electro-optical detector arrays and at least two prisms, the prisms being configured to collect light energy from disparate locations and project the respective collected light energy onto a common electro-optical detector array.

In a further embodiment, the present invention provides an apparatus for enhancing large-format digital images. The apparatus includes one or more primary optical systems and one or more secondary optical systems. Each secondary optical system includes one or more electro-optical detector arrays and at least one set of mirrors, at least two mirrors comprising the set being configured to collect light energy from disparate locations and project the respective collected light energy onto a common electro-optical detector array.

In yet another embodiment, the present invention provides a method for enhancing large-format digital images. The method includes receiving primary image data from at least one primary optical system, receiving secondary image data from at least one secondary optical system, and arranging the secondary image data with respect to the primary image data such that a angle-of-view of the primary image data is enhanced by the secondary image data. The secondary image data includes image data from two disparate regions received substantially simultaneously by a single electro-optical detector array, the secondary image data being filtered through at least one polarization filter.

Another embodiment of the present invention provides an apparatus for enhancing large-format digital images. The apparatus includes one or more primary optical systems and one or more secondary optical systems. Each secondary optical system includes one or more electro-optical detector arrays; at least two prisms, the prisms being configured to collect light energy from disparate locations and project the respective collected light energy onto a common one of the one or more electro-optical detector arrays; and at least one polarization filter configured to filter the light energy collected by each of the at least two prisms such that light energy from a first of the at least two prisms is configured to be projected onto a first region of the electro-optical detector array and light energy from a second of the at least two prisms is configured to be projected onto a second region of the electro-optical detector array, the first and second regions of the electro-optical detector array being disparate from one another.

Still further, an embodiment of the present invention provides an apparatus for enhancing large format digital images. The apparatus includes one or more primary optical systems and one or more secondary optical systems. Each secondary optical system includes one or more electro-optical detector arrays; at least one set of mirrors, at least two mirrors comprising the set being configured to collect light energy from disparate locations and project the respective collected light energy onto a common one of the one or more electro-optical detector arrays; and at least one polarization filter configured to filter the light energy collected by each of at least two mirrors such that light energy from a first of the at least two mirrors is configured to be projected onto a first region of the electro-optical detector array and light energy from a second of the at least two mirrors is configured to be projected onto a second region of the electro-optical detector array, the first and second regions of the electro-optical detector array being disparate from one another.

In another embodiment, the present invention provides a method for generating large-format color digital images. The method includes receiving image data from a plurality of optical systems, each of the plurality of optical systems configured for collecting image data from a different color channel, and generating an image from the received image data, wherein a quantity of colors represented in the generated image is greater than a quantity of optical systems from which image data is received, and wherein any color not received from one of the plurality of optical systems is calculated utilizing data associated with colors corresponding with each of the different color channels.

In yet another embodiment, the present invention provides a method for generating large-format color digital images. The method includes receiving image data from a first optical system, the first optical system configured for collecting image data associated with a red color channel; receiving image data from a second optical system, the second optical system configured for collecting image data associated with a blue color channel; receiving image data from a third optical system, the second optical system configured for collecting image data associated with a near-infrared color channel; and calculating image data associated with a green color channel utilizing the image data received from each of the first, second and third optical systems.

Still further, in an embodiment, the present invention provides an apparatus for generating a large-format color digital image. The apparatus includes a primary optical system configured for collecting panchromatic image data, and a plurality of secondary optical systems, each secondary optical system being configured for collecting image data from a different one of a plurality of color channels, wherein a quantity of the plurality of color channels is less than a quantity of colors represented in the large-format color digital image.

Figure 2:
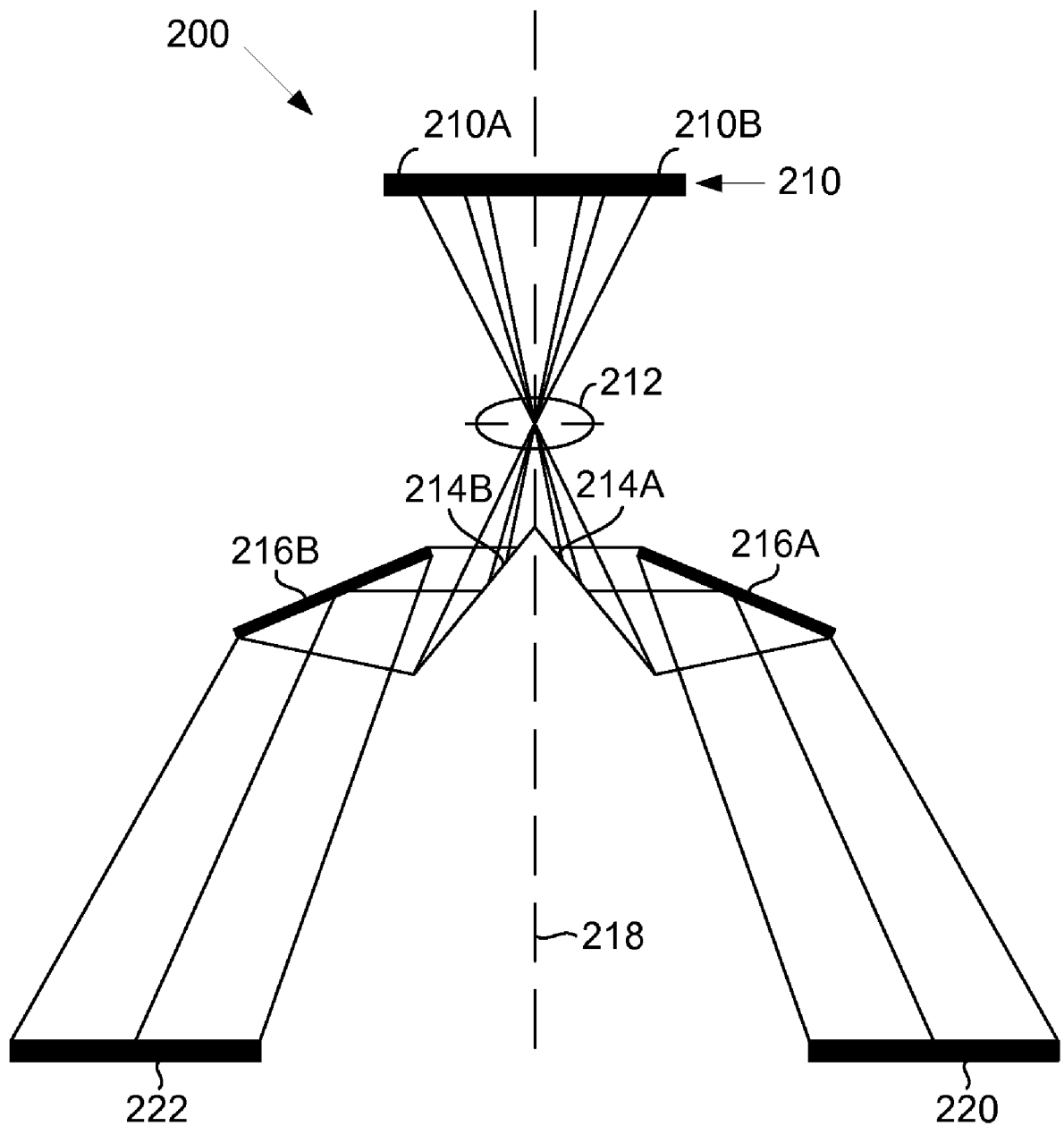
FIG. 2 is a schematic diagram illustrating an exemplary secondary optical system having a single electro-optical detector array and a set of mirrors configured to collect light energy from disparate locations and project the respective collected light energy onto the electro-optical detector array, in accordance with an embodiment of the present invention.

As previously stated, embodiments of the present invention utilize one or more arrays of electro-optical detector devices, such as charge-coupled devices (CCDs), and multiple optical systems (primary and secondary) to build a single, large format camera system that fits into a single camera mount and is capable of generating large format, digital macro-images with an extended angle-of-view. Turning now to FIG. 2, a schematic diagram is illustrated which shows an exemplary secondary optical system 200 in accordance with an embodiment of the present invention. The secondary optical system 200 includes a single electro-optical detector array 210 exposed through one lens system 212 and one mechanical shutter (not shown). The detector array 210 comprises an array of individual electro-optical detectors, e.g., semiconductor devices that output an electric signal, the magnitude of which is dependent on the intensity of light energy incident on such electro-optical detector. Therefore, the signal from each electro-optical detector in the array 210 is indicative of light energy intensity from a pixel area of the portion of the object or terrain being photographed, and the signals from all of the individual electro-optical detectors in the array 210 are indicative of light energy intensity from all of the pixel areas of the portion of the object or terrain being photographed. Therefore, the signals from the electro-optical detectors in the detector array 210, together, are indicative of the pattern of light energy from the portion of the object being photographed, so a sub-image of the portion of the object can be produced from such signals. First, however, the signals are amplified, digitized, processed, and stored, as is well-known to those of ordinary skill in the art.

The electro-optical detector array 210 is connected electrically by suitable conductors to a control circuit (not shown) which includes, at least, a microprocessor, input/output circuitry, memory, and a power supply for driving the electro-optical detector array 210, reading sub-image data out of the array 210, and storing such sub-image data. Other data processing functions, for example combining sub-images and/or image display functions, may be accomplished in the secondary optical system 200 or with other peripheral data processing equipment.

The secondary optical system 200 additionally includes a symmetric set of optical mirrors 214A/216A, 214B/216B arranged in such a way that the angle-of-view of the secondary optical system 200 is split into two symmetric parts, each part appearing under a specific viewing angle with respect to the optical axis 218 of the single optical lens (included in lens system 212). In operation, light energy from the portion of the object or terrain being photographed is reflected from one mirror 216A, 216B of each pair 214A/216A, 214B/216B to the other mirror comprising the pair 214A, 214B. The reflected light energy from both mirrors 214A/216A, 214B/216B is subsequently exposed through the single lens system 212 and made incident upon disparate regions 210A, 210B (respectively) of the single electro-optical detector array 210. The resultant sub-images may then be utilized to enhance image data collected via an associated primary optical system, as more fully described herein below.

Thus, the illustrated secondary optical system 200 has the capability to produce image content of two individual symmetric parts of the angle-of-view at a substantially simultaneous exposure time steered by a common electronic shutter. The shutter and its electronic actuator are not shown in FIG. 2 because of drawing size constraints. However, shutters and shutter actuators are well-known to persons of ordinary skill in the art and, accordingly, they are not further described herein.

The footprint of the secondary optical system 200 shows two areas 220, 222 with a specific offset to the optical axis 218. The magnitude of this offset and its relationship to image data captured by a corresponding primary optical system are more fully described below with reference to FIGS. 7 through 11.

Figure 3:
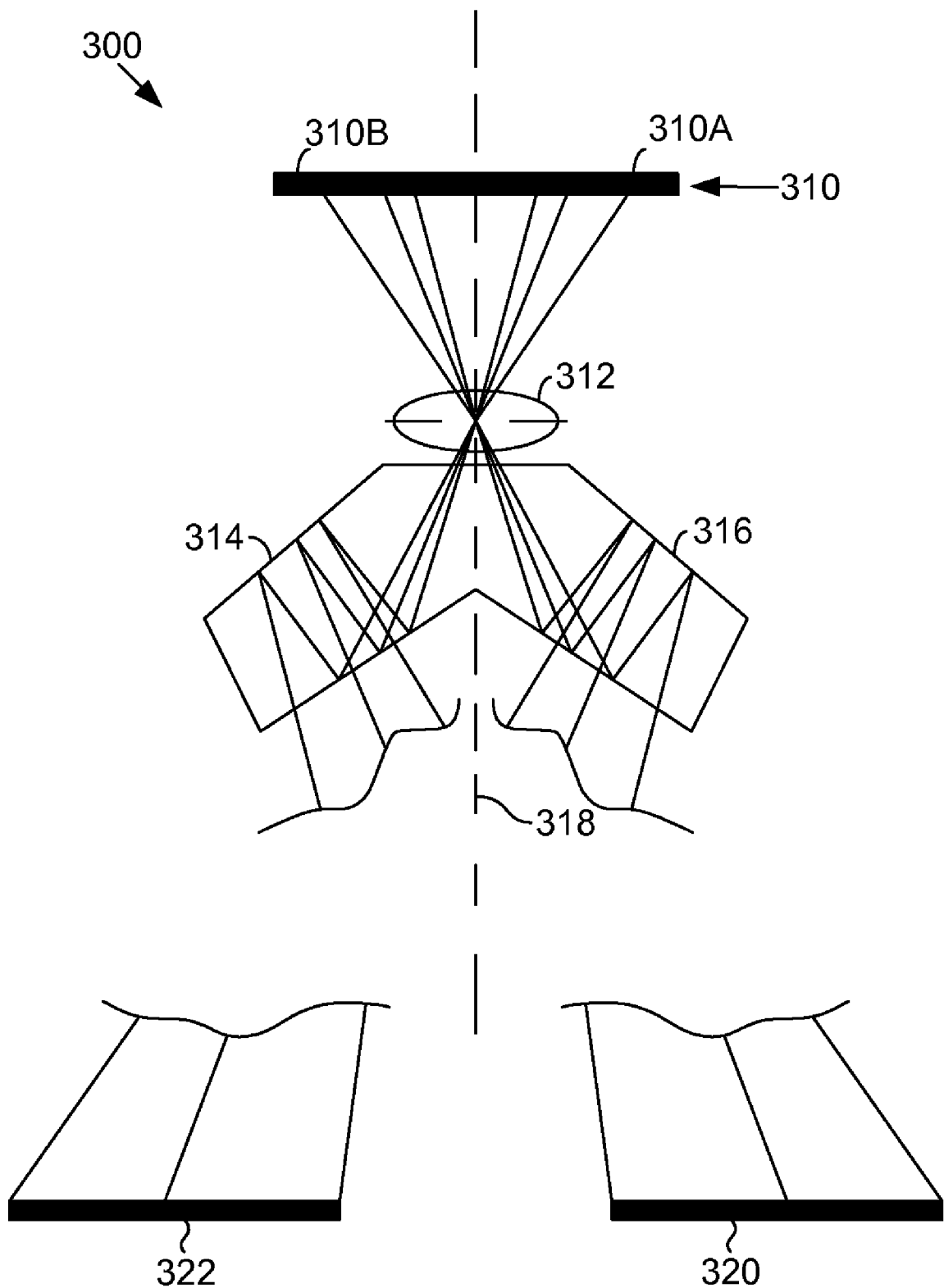
FIG. 3 is a schematic diagram illustrating an exemplary secondary optical system having a single electro-optical detector array and a pair of prisms configured to collect light energy from disparate locations and project the respective collected light energy onto the electro-optical detector array, in accordance with an embodiment of the present invention.

With reference to FIG. 3, a schematic diagram is illustrated which shows a secondary optical system 300 in accordance with another embodiment of the present invention. The secondary optical system 300 includes a single detector array 310 exposed through a single lens system 312 and a single mechanical shutter (not shown). (The detector array 310 is similar to that described herein above with reference to detector array 210 of FIG. 2.) The secondary optical system 300 additionally includes a symmetric set of optical prisms 314, 316 arranged in such a way that the angle-of-view of the secondary optical system 300 is split into two symmetric parts wherein each part appears under a specific viewing angle with respect to the optical axis 318 of the single optical lens (included in lens system 312). In operation, light energy from the portion of the object or terrain being photographed is reflected from each prism 314, 316, exposed through the single lens system 312, and made incident upon disparate regions 310A, 310B (respectively) of the single electro-optical detector array 310. The resultant sub-images may then be utilized to enhance image data collected via an associated primary optical system, as more fully described herein below.

As with the secondary optical system 200 of FIG. 2, the illustrated secondary optical system 300 has the capability to produce image content of the two individual symmetric parts of the angle-of-view at a substantially simultaneous exposure time steered by a common electronic shutter (not shown). The footprint of the secondary optical system 300 shows two areas 320, 322 offset to the optical axis 318. The magnitude of this offset and its relationship to image data captured by a corresponding primary optical system are more fully described below with reference to FIGS. 7 through 11.

Figure 4:
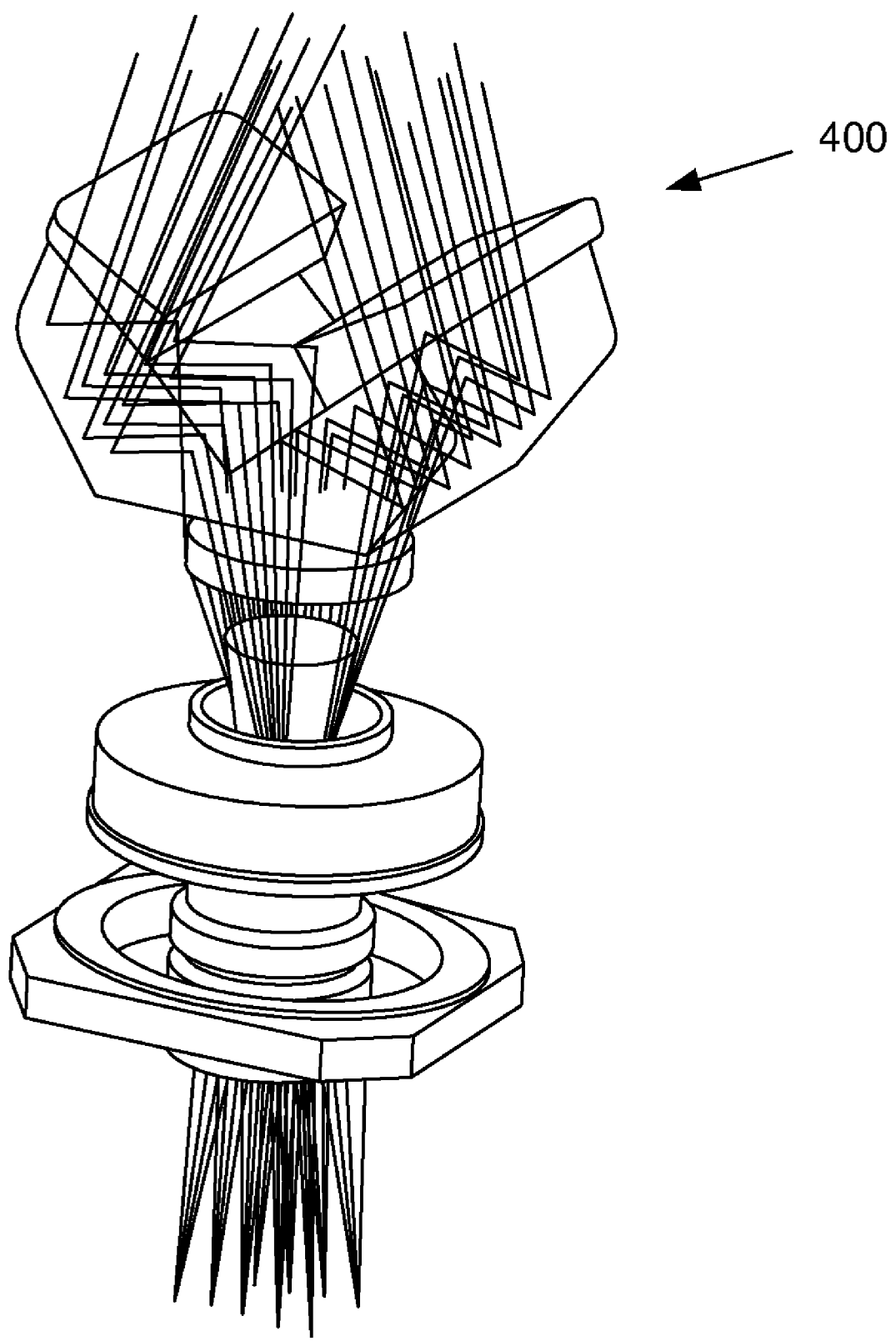
FIG. 4 is an exemplary three-dimensional schematic view of a secondary optical system in accordance with the embodiment illustrated in FIG. 3.

FIG. 4 is an exemplary three-dimensional schematic view of a secondary optical system 400 in accordance with the embodiment illustrated in FIG. 3. As can be seen, the secondary optical system 400 is configured to acquire two disparate sub-images and project them onto a single CCD detector array (not shown).

Figure 5:
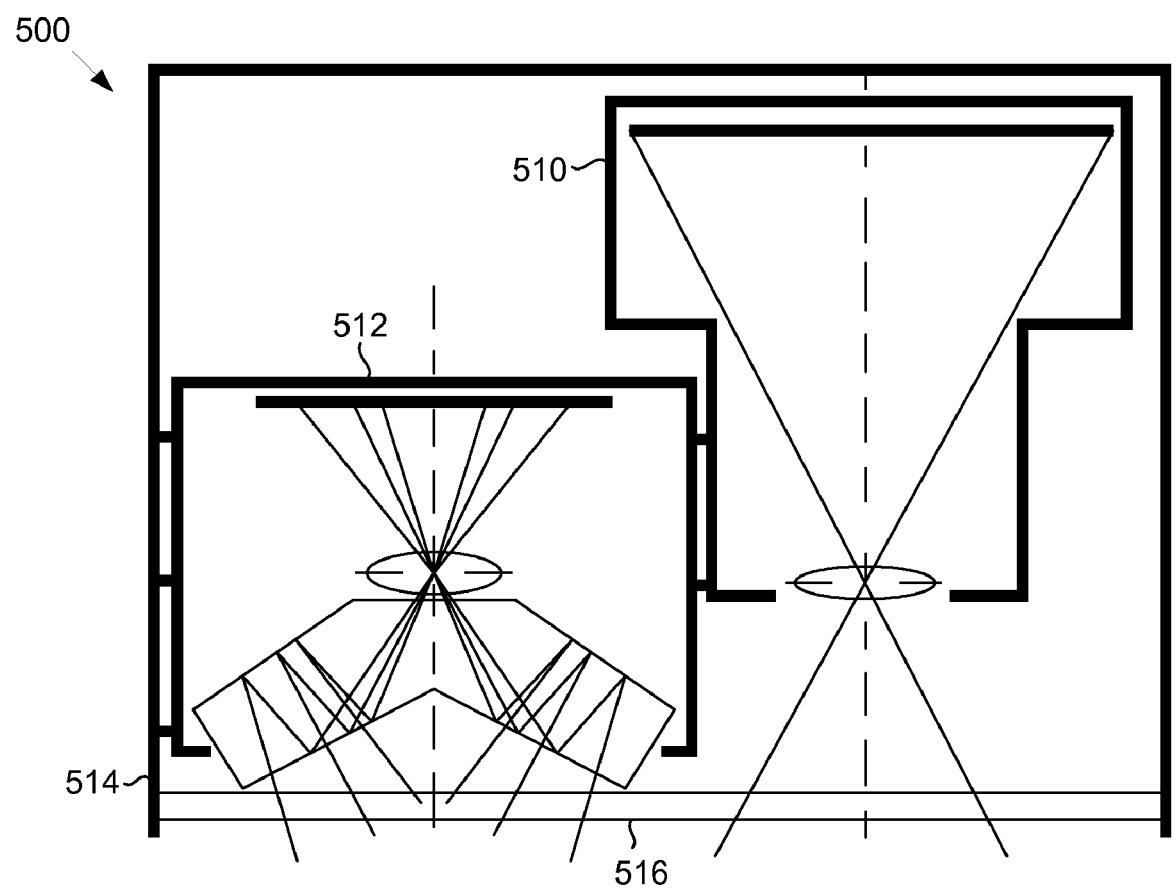
FIG. 5 is a schematic diagram illustrating an exemplary embodiment of an overall camera system having a primary optical system and a secondary optical systems including a pair of prisms configured to project collected light energy onto a single electro-optical detector array, in accordance with an embodiment of the present invention.

Embodiments of the present invention utilize one or more detector arrays and multiple optical systems (primary and secondary) to build a single large format camera system that fits into a single camera mount and is capable of generating large format, digital images with an extended angle-of-view. FIG. 5 is a schematic diagram illustrating one exemplary embodiment of an overall camera system 500 in accordance with embodiments of the present invention. The exemplary overall camera system 500 includes a single primary optical system 510 and a single secondary optical system 512 seated adjacent one another in the same camera housing 514 and protected by a glass plate 516. While the illustrated secondary optical system 512 includes a pair of prisms, e.g., in accordance with the embodiment of FIG. 3, it will be understood by those of ordinary skill in the art that a secondary camera system including a set of optical mirrors (e.g., in accordance with the embodiment of FIG. 2), may also be utilized within the scope of embodiments hereof. Further, though a single primary camera system 510 and a single secondary camera system 512 are shown, plurality of primary and/or secondary camera systems may be included in the camera housing 514, if desired, within the scope of embodiments of the present invention.

In embodiments, the overall camera system 500 is configured to fit within the constraints of conventional aerial photography equipment. That is, the overall camera system 500, including the primary optical system(s) 510 and the secondary optical system(s) 512 is configured such that conventional aerial photography housings may be utilized. In this way, an enhanced image may be obtained, relative to the primary image alone, while additional expense independent of the camera system itself is not necessary.

Figure 6:
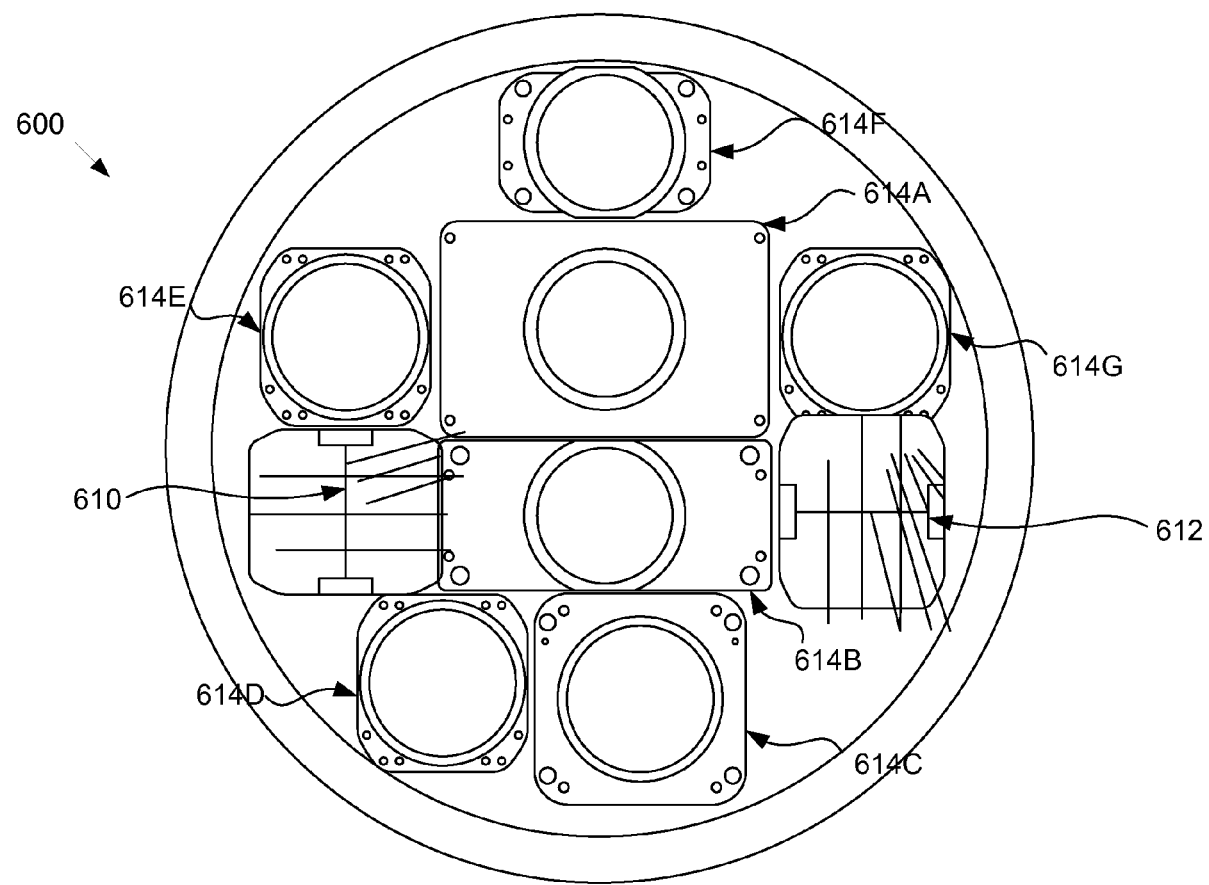
FIG. 6 is a schematic diagram illustrating an exemplary embodiment of an overall camera system having a plurality of primary optical systems and two secondary optical systems, one for enhancing the primary image in the left and right directions and one for enhancing the primary image in the fore and aft directions, in accordance with an embodiment of the present invention.

FIG. 6 is a schematic diagram illustrating an exemplary embodiment of an overall camera system 600 in accordance with embodiments of the present invention. The exemplary overall camera system 600 includes a secondary optical system 610 including a pair of prisms for acquiring images in the left and right directions, a secondary optical system 612 including a pair of prisms for acquiring images in the fore and aft directions, and seven optical systems 614A-614G configured for acquiring primary image data. It will be understood and appreciated by those of ordinary skill in the art that the seven optical systems 614A-614G are exemplary in nature and in number. In accordance with embodiments hereof, any number of optical systems may be utilized to acquire the sub-images that will ultimately be utilized to generate the primary image, the resultant sub-images of each optical system, for instance, being stitched together to generate the primary image as described more fully below. It will be further understood that the illustrated secondary optical systems 612, 614 are also exemplary in nature and in number. For instance, one or both of the illustrated secondary optical systems 612, 614 may comprise a set of optical mirrors rather than prisms as discussed hereinabove with reference to FIG. 2. Additionally, more or fewer than the two illustrated secondary optical systems 612, 614 may be utilized if desired. Any and all such variations, and any combination thereof, are contemplated to be within the scope of the embodiments of the present invention.

As is illustrated in FIGS. 5 and 6 (discussed herein above), the sub-images acquired by the secondary optical system(s) are configured to enhance the angle-of-view of image data acquired by one or more associated primary optical systems. Accordingly, the secondary optical system(s) are arranged such that the area of the object or terrain being photographed utilizing the primary optical system is extended in at least two symmetrical and opposing directions (e.g., left and right or fore and aft). Accordingly, the secondary optical system(s) is configured such that a portion of the secondary sub-images acquired thereby coincides with a portion of the primary image data acquired utilizing the associated primary optical system(s). Such coincidence may occur with image data overlap, without image data overlap, or utilizing a combination of overlapping and non-overlapping image data, as more fully described below.

Figure 7:
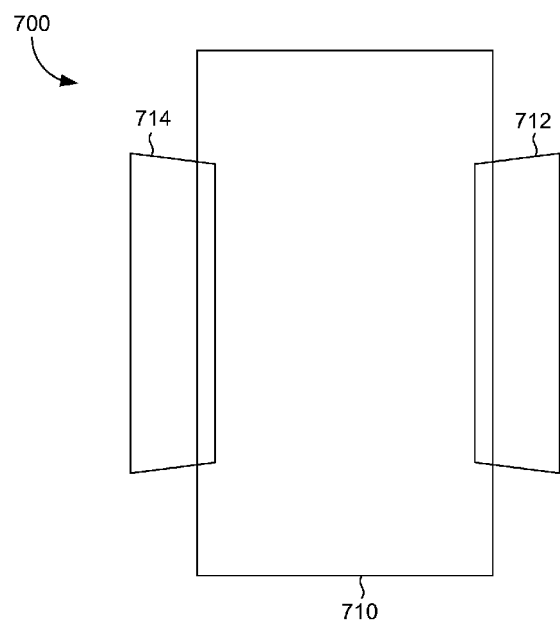
FIG. 7 is a schematic diagram showing the footprint of a primary optical system and the footprint of s secondary optical system being combined in such a way that the respective footprints show overlap, in accordance with an embodiment of the present invention.

With reference to FIG. 7, an embodiment of an extended/enhanced large-format digital image 700 is illustrated wherein overlap between a primary image 710 (acquired via one or more primary optical systems) and secondary sub-images 712, 714 in the left and right directions (acquired via a secondary optical system) occurs. The geometric relationship between the image 710 and sub-images 712, 714 may be controlled by adjusting the angles of mirrors and/or prisms utilizing a geometric calibration of the apparatus using a well-surveyed, three-dimensional calibration target in a calibration laboratory by photogrammetric methods known to those of ordinary skill in the art. An additional geometric adjustment comprising the secondary optical system and the secondary sub-images may be performed for each image produced by the apparatus during a flight mission utilizing image matching technologies known to those of ordinary skill in the art.

The corrected sub-images may then be "stitched" with the primary image to generate a single output image, for instance, utilizing techniques set forth in commonly assigned U.S. Pat. No. 7,009,638, the content of which is hereby incorporated by reference as if set forth in its entirety herein. Software is then utilized to calibrate the individual sub-images of the primary optical system and the secondary optical system(s) to one another by use of a precisely surveyed and well-structured object (calibration object). This calibration result is then utilized to "stitch" the sub-images into one single seamless image. Both the radiometry and the geometry will be virtually seamless in the output image, since the sub-images will be transformed into one single output image coordinate system by exploiting the results of the calibration procedure. The resultant "stitched" image may appear as extended angle-of-view image 110 of FIG. 1B. It will be understood and appreciated by those of ordinary skill in the art that in camera systems having a plurality of primary optical systems, the image data acquired by each of the primary optical systems may be stitched to generate the primary image using similar techniques.

Figure 8:
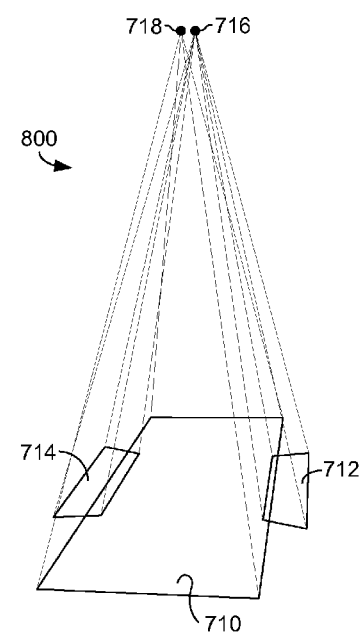
FIG. 8 is a schematic diagram illustrating an overall camera system configured for producing the primary and secondary footprints shown in FIG. 7, in accordance with an embodiment of the present invention.

FIG. 8 is a schematic diagram illustrating an overall camera system 800 configured for producing the primary image 710 and secondary sub-images 712, 714 shown in FIG. 7, in accordance with an embodiment of the present invention. It can be seen in FIG. 8 that the perspective center for the two secondary sub-images (that is, the perspective center 716 of the secondary optical system) is a single point in space, but is a point separate from the perspective center of the primary image (that is, the perspective center 718 of the associated primary optical system). The positional difference is kept very small so that the stitched output image does not show adverse geometric effects.

Figure 9:
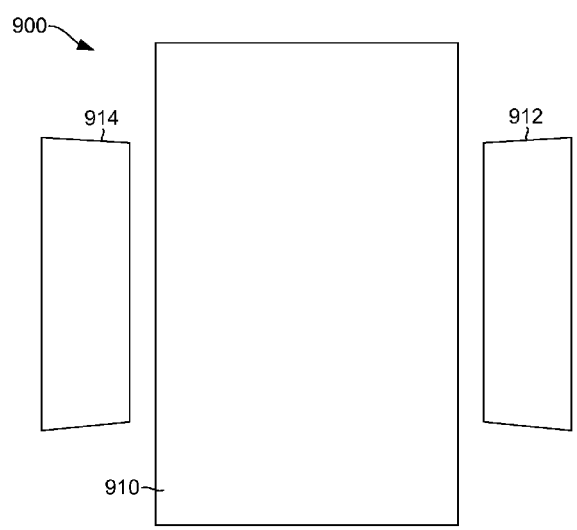
FIG. 9 is a schematic diagram showing the footprint of a primary optical system and the footprint of a secondary optical systems being combined in such a way that the footprints do not overlap, in accordance with an embodiment of the present invention.

In another embodiment of an enhanced/extended large-format digital image 900, the primary image 910 acquired utilizing a primary optical system and the secondary sub-images 912, 914 acquired utilizing one or more secondary optical system(s) do not overlap. This embodiment is illustrated in FIG. 9. In a photogrammetric application wherein images are being exposed along a specific flight line and under a specific sequence, however, the sub-images 912, 914 acquired by the secondary optical system(s) of a single exposure position overlap with the primary image 910 acquired by the primary optical system taken one exposure prior and one exposure after that primary image in the chronology of the image sequence. In this manner, complete coverage of an extended area of terrain may be imaged without any holes utilizing an appropriate flight plan trigger strategy, as more fully described herein below with reference to FIGS. 14 and 15.

As with the embodiment illustrated in FIG. 7, the geometric relationship between the primary image 910 acquired by the primary optical system and secondary sub-images 912, 914 acquired by the secondary optical system may be controlled by adjusting the angles of mirrors and/or prisms utilizing a geometric calibration of the apparatus using a well-surveyed, three-dimensional calibration target in a calibration laboratory by photogrammetric methods known to those of ordinary skill in the art. An additional geometric adjustment comprising the secondary optical system and the secondary sub-images may be performed for each image produced by the apparatus during a flight mission utilizing image matching technologies known to those of ordinary skill in the art.

Software may then be utilized to calibrate the individual sub-images of the primary optical system and the secondary optical system(s) to one another by use of a precisely surveyed and well-structured object (calibration object). This calibration result then may be utilized to stitch the sub-images into one single seamless image. Both the radiometry and the geometry will be virtually seamless in the output image, since the sub-images will be transformed into one single output image coordinate system by exploiting the results of the calibration procedure if there are no overlaps between the optical sensors of the primary and secondary optical systems.

Figure 10:
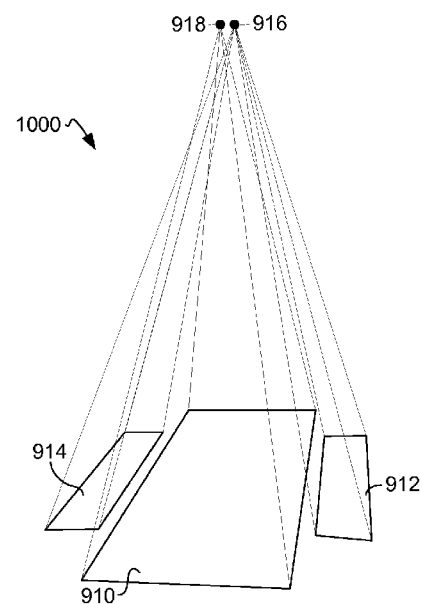
FIG. 10 is a schematic diagram illustrating an overall camera system configured for producing the primary and secondary footprints shown in FIG. 9, in accordance with an embodiment of the present invention.

FIG. 10 is a schematic diagram illustrating an overall camera system 1000 configured for producing the primary image 910 and secondary sub-images 912, 914 shown in FIG. 9, in accordance with an embodiment of the present invention. It can be seen in FIG. 10 that the perspective center for the two secondary sub-images (that is, the perspective center 916 of the secondary optical system) is a single point in space, but is a point separate from the perspective center of the primary image (that is, the perspective center 918 of the associated primary optical system). The positional difference is kept very small so that the stitched output image does not show adverse geometric effects. Note that the angles of the prisms and/or mirrors comprising the secondary optical system differ between FIGS. 8 and 10 leading to the differing image footprints illustrated.

If the sub-images of the overall camera system 1000 illustrated in FIG. 10 are produced along a well-defined flight line by means of aerial photogrammetric image acquisition, the images acquired by the primary optical system overlap with one another in the sequence of exposures along such flight line. Additionally, the images acquired by the secondary optical system(s) overlap with the images acquired by the primary optical system of each previous exposure relative to the next exposure. That is, if a series of ten sub-images are acquired by each of the primary and secondary optical systems, the sub-images of each camera system designated as one through ten based on the acquisition chronology, the second sub-image(s) of the secondary optical system(s) will overlap with the first image of the primary optical system, the third sub-image(s) of the secondary optical system(s) will overlap with the second image of the primary optical system, and so on. This will occur as long as the secondary optical system(s) is oriented parallel to the direction of the flight line. Such overlaps may then be exploited to refine any transformation parameters of sub-images into an image coordinate system of the sequence of images taken with the primary optical system utilizing photogrammetric aerial triangulation. Such aerial triangulation exploits the synchronized exposure of the two sub-areas of the secondary optical system based on an optical system design utilizing one single lens and one single mechanical shutter.

Figure 11:
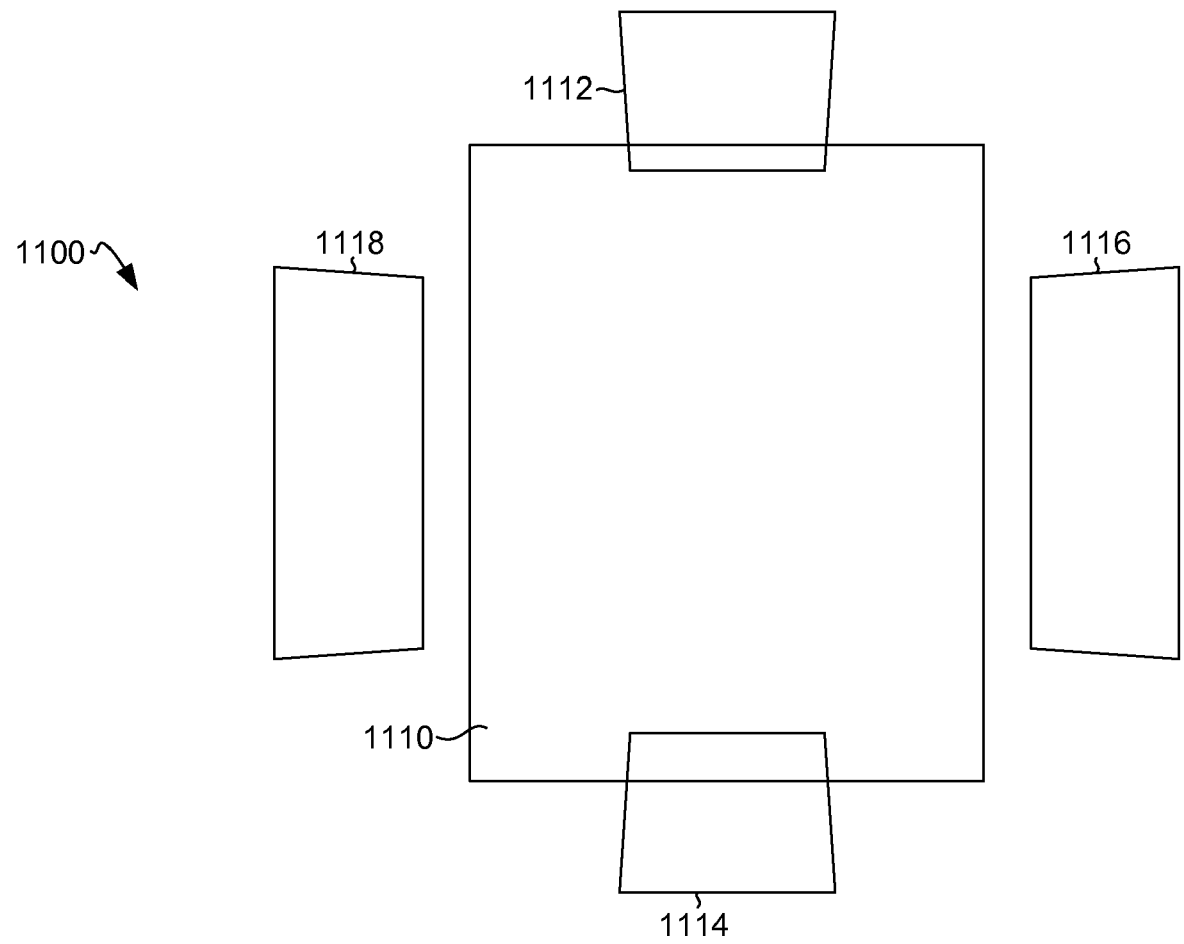
FIG. 11 is a schematic diagram illustrating that in secondary optical systems having more than one electro-optical detector array, overlapping the primary image and the secondary sub-images may be combined with the non-overlapping modus, in accordance with an embodiment of the present invention.

FIG. 11 is a schematic diagram 1100 illustrating that, in accordance with embodiments hereof, overlapping of the primary image 1110 and the secondary sub-images 1112, 1114 may be combined with the non-overlapping modus (see the relationship between the primary image 1110 and secondary images 1116 and 1118).

In accordance with embodiments hereof, the secondary sub-images (i.e., the images acquired by the secondary optical system(s)) may be triggered substantially simultaneously with the primary image and, accordingly, be acquired at the same position and with the same camera attitude as the primary image. Alternatively, the trigger for the secondary sub-images may be independent from the primary image, e.g., may be at a higher rate that the primary image trigger. Either embodiment, as well as any combination thereof, is contemplated to be within the scope of embodiments of the present invention.

In one embodiment, an overall camera system in accordance with embodiments hereof includes a single secondary imaging arrangement (e.g., an optical system for capturing images in the left and right directions and a single optical system for capturing images in the fore and aft directions) per primary image. Further, the primary image includes a plurality of sub-images (for instance, nine sub-images) stitched together. Accordingly, the side-length of the stitched primary image is larger than that of an individual area array CCD, e.g., three times larger. The individual secondary sub-image patches represent half of the surface of a single area array CCD. As such, the side-length of the secondary sub-images is smaller than the side-length of the primary image. It should be noted, however, that embodiments of the present invention are not limited to a single secondary imaging arrangement per primary image but rather could implement two or more secondary imaging arrangements, for instance, two or more for capturing images in the left and right directions and two or more for capturing images fore and aft, per primary image if desired.

As described herein above, FIGS. 7, 9 and 11 illustrate variations on the overlaps that may exist between primary images captured utilizing the primary, vertical-looking, optical system and the extended angle-of-view sub-images captured utilizing the secondary optical system(s). The area CCD arrays are typically rectangular and they often are designed to fit the classical 24 mm by 36 mm film format of classical film cameras. As embodiments of the present invention dedicate on such an area array CCD, two partial images obtained through a single lens, the optical systems may be arranged in various ways. The use of one single such lens and area CCD array to obtain either overlapping or non-overlapping secondary sub-images is illustrated in FIGS. 7 and 9, respectively, described hereinabove. The use of a single such lens and area CCD array per secondary optical system wherein two secondary optical systems are utilized to mix the overlapping modulus and non-overlapping modulus is illustrated in FIG. 11, also described hereinabove.

As described herein, secondary optical systems according to embodiments of the present invention include a set of mirrors or prisms configured to project light energy from two disparate areas of an object or terrain being photographed through a single lens system onto a single electro-optical detector array. For instance, one of the mirrors/prisms may project light energy onto the right side of the electro-optical detector array and the other of the mirrors/prisms may project light energy onto the left side of the same electro-optical detector array. At times, such an arrangement may create a "gray" zone near the center line of the electro-optical detector array where light energy from both mirrors/prisms may be incident. In embodiments hereof, polarization filters may be utilized and situated with respect to the lens system to aid in ensuring that light collected through one mirror/prism does not reach the portion of the electro-optical detector array surface intended for the other mirror/prism. Exemplary such embodiments are shown in FIGS. 12 and 13.

Figure 12:
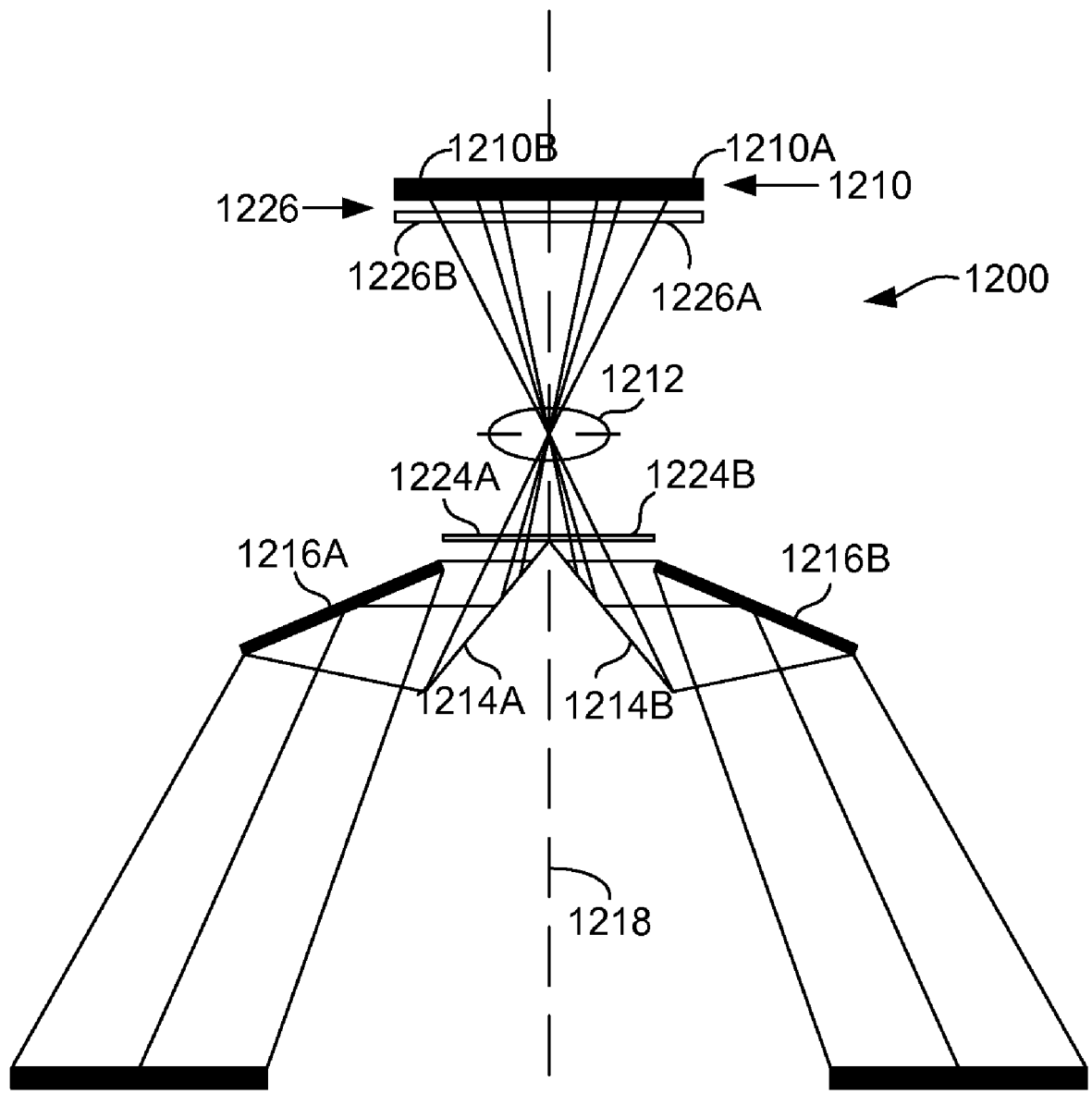
FIG. 12 is a schematic diagram illustrating an exemplary secondary optical system having a single electro-optical detector array and a set of mirrors configured to collect light energy from disparate locations and project the respective collected light energy onto the electro-optical detector array and having a set of polarization filters, in accordance with an embodiment of the present invention.
Figure 13:
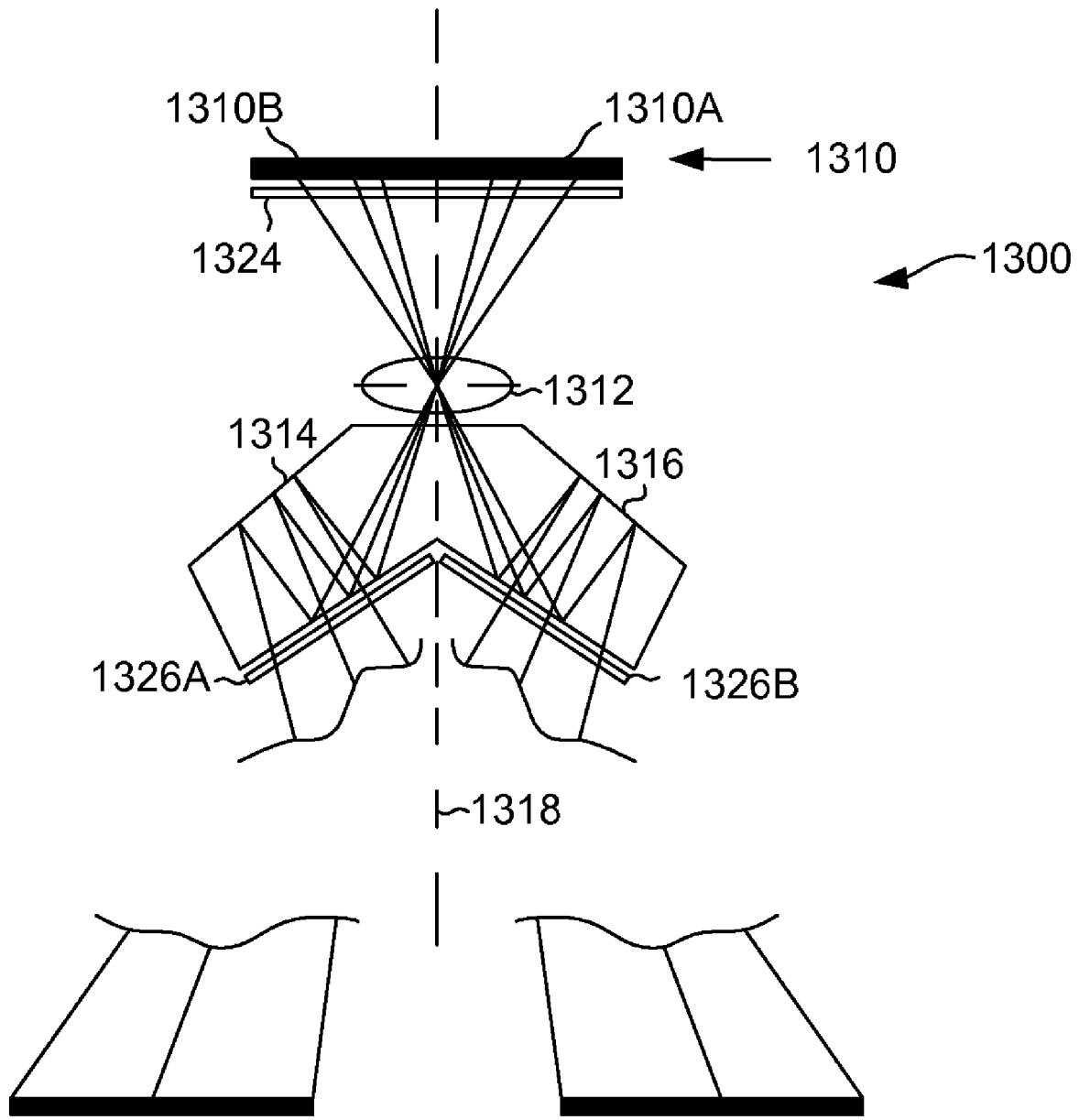
FIG. 13 is a schematic diagram illustrating an exemplary secondary optical system having a single electro-optical detector array and a pair of prisms configured to collect light energy from disparate locations and project the respective collected light energy onto the electro-optical detector array and having a set of polarization filters, in accordance with an embodiment of the present invention.

With reference to FIG. 12, a schematic diagram is illustrated which shows an exemplary secondary optical system 1200 in accordance with an embodiment of the present invention, having a set of polarization filters 1224, 1226 associated therewith. As with the embodiment illustrated in FIG. 2 (described above), the secondary optical system 1200 includes a single electro-optical detector array 1210 exposed through once lens system 1212 and one mechanical shutter (not shown). The detector array 1210 comprises an array of individual electro-optical detectors, the signal from each electro-optical detector in the array 1210 being indicative of light energy intensity from a pixel area of the portion of the object or terrain being photographed. The signals from all of the individual electro-optical detectors in the array 1210 are indicative of light energy intensity from all of the pixel areas of the portion of the object or terrain being photographed. Therefore, the signals from the electro-optical detectors in the detector array 1210, together, are indicative of the pattern of light energy from the portion of the object being photographed, so a sub-image of the portion of the object can be produced from such signals.

The electro-optical detector array 1210 is connected electrically by suitable conductors to a control circuit (not shown) which includes, at least, a microprocessor, input/output circuitry, memory, and a power supply for driving the electro-optical detector array 1210, reading sub-image data out of the array 1210, and storing such sub-image data. Other data processing functions, for example combining sub-images and/or image display functions, may be accomplished in the secondary optical system 1200 or with other peripheral data processing equipment.

The secondary optical system 1200 additionally includes a symmetric set of optical mirrors 1214A, 1214B, 1216A, 1216B arranged in such a way that the angle-of-view of the secondary optical system 1200 is split into two symmetric parts, each part appearing under a specific viewing angle with respect to the optical axis 1218 of the single optical lens (included in lens system 1212). Additionally, the secondary optical system 1200 includes a set of two pairs of polarization filters 1224A/1224B, 1226A/1226B. The first set of polarization filters 1226A/1226B is mounted directly in front of the CCD detector array (e.g., at a distance less than about 2 mm). This set of polarization filters 1226 comprises two parts/filters 1226A, 1226B, each part/filter overlapping half 1210A, 1210B (respectively) of the detector array 1210 area. The polarization directions of these two filter parts/filters have a difference of 90°.

The second set of polarization filters 1224A, 1224B is mounted between the object or terrain being photographed and the lens system 1212. In one embodiment, the second set of polarization filters 1224A, 1224B is mounted in front of the aperture of the entire secondary optical system 1200.

In operation, light energy from the portion of the object or terrain being photographed is reflected from one mirror 1216A, 1216B of each pair to the other mirror comprising the pair 1214A, 1214B (respectively). The reflected light energy from both mirrors 1214 1216 is subsequently exposed through the second set of polarization filters 1224A, 1224B, the single lens system 1212, and the first set of polarization filters 1226A, 1226B, and made incident upon the single electro-optical detector array 1210. The resultant sub-images may then be utilized to enhance image data collected via an associated primary optical system (not shown).

With reference to FIG. 13, a schematic diagram is illustrated which shows a secondary optical system 1300 in accordance with another embodiment of the present invention, having a set of polarization filters (1324, 1326) associated therewith. As with the secondary optical system 300 shown in FIG. 3, the secondary optical system 1300 includes a single detector array 1310 exposed through a single lens system 1312 and a single mechanical shutter (not shown). (The detector array 1310 is similar to that described herein above with reference to detector array 1210 of FIG. 12.) The secondary optical system 1300 additionally includes a symmetric set of optical prisms 1314, 1316 arranged in such a way that the angle-of-view of the secondary optical system 1300 is split into two symmetric parts wherein each part appears under a specific viewing angle with respect to the optical axis 1318 of the single optical lens (included in lens system 1312). Additionally, the secondary optical system 1300 includes a set of two pairs of polarization filters (1324A/1324B, 1326A/1326B). The first set of polarization filters 1324A, 1324B is mounted directly in front of the CCD detector array 1310 (e.g., at a distance less than about 2 mm). This set of polarization filters 1324A, 1324B comprises two parts/filters (1224A, 1324B), each part/filter overlapping half 1310A, 1310B (respectively) of the detector array 1310 area. The polarization direction of these two parts/filters 1324A, 1324B have a difference of 90°.

The second set of polarization filters 1326A, 1326B is mounted between the object or terrain being photographed and the lens system 1312. In one embodiment, the second set of polarization filters 1326A, 1326B is mounted in front of the aperture of the entire secondary optical system 1300, as shown in FIG. 13.

In operation, light energy from the portion of the object or terrain being photographed is exposed through the second set of polarization filters 1326A, 1326B, reflected from each prism 1314, 1316 through the single lens system 312, and the first set of polarization filters 1324A, 1324B, and made incident upon the single electro-optical detector array 1310. The resultant sub-images may then be utilized to enhance image data collected via an associated primary optical system.

One implementation for overall camera systems in accordance with embodiments hereof is a large format, digital aerial camera system configured to collect hundreds or thousands of images in a single aerial photogrammetric flight mission, often at a rate of three to four Gigabits per second. In such an embodiment, the overall camera system will typically include two or more optical systems, each of which is equipped with electronically steered shutters. In one embodiment (illustrated in FIG. 6), there are seven optical systems configured for acquiring sub-images that will ultimately be combined or stitched to form the primary image and two optical systems configured for acquiring the secondary sub-images, one configured for acquiring sub-images in the left and right directions and one configured for acquiring sub-images in the fore and aft directions. All optical systems comprising the overall camera system have shutters, and the shutter operation for all optical systems is coordinated at a very high precision (to within microseconds). This allows for management of the image acquisition procedure in such a way that the exposure times of all camera components are synchronized. However, each shutter may be programmed separately to open and close. In this way, each optical system may have its own exposure time and may be triggered separately, if desired.

The imaging sensors (each of them producing a sub-image smaller than the entire output image of the overall camera system) are individually connected to electronic modules such as sensor electronic, analog electronic, digital electronic, and computer interface modules, and thus produce individual data streams from the sensor to the storage media. This concept supports a parallel data capture and, therefore, makes small time intervals between exposures possible. In lieu of a single monolithic larger area array CCD that would be slow to read out, multiple smaller sized array CCDs that are faster (and less expensive) may be used.

It should be noted that only a medium level of accuracy with respect to exposure synchronization (synchronization of the mechanical shutters of the primary optical system and the secondary optical systems) is necessary to empower the process of automated stitching. Stitching, as described herein above, is the process by which the output image is generated from the multiple sub-images. This includes the matching of sub-images from the secondary optical systems to images of the primary optical system, either triggered simultaneously or separately.

The two sub-images of each secondary camera system are produced by a single detector array per system. Accordingly, the image content of the two sub-images of each secondary optical system is processed in one single data stream per system and in a precise geometric relationship to one another.

An individual image trigger produces a single assembly of primary and secondary images. The instantaneous angle-of-view has been illustrated in various figures and consists of the rectangular basic angle-of-view of the primary sensor having attached thereto the extensions protruding from the basic angle-of-view, the extensions being the sub-image acquired by the secondary optical system(s). The resulting computed single output image will therefore have an irregular shape, that is, will not typically be rectangular. Accordingly, imaging of an extended terrain surface from an aerial platform, for instance, a fixed wing aircraft, so that each point on the ground can be analyzed stereoscopically is uniquely challenging.

Figure 14:
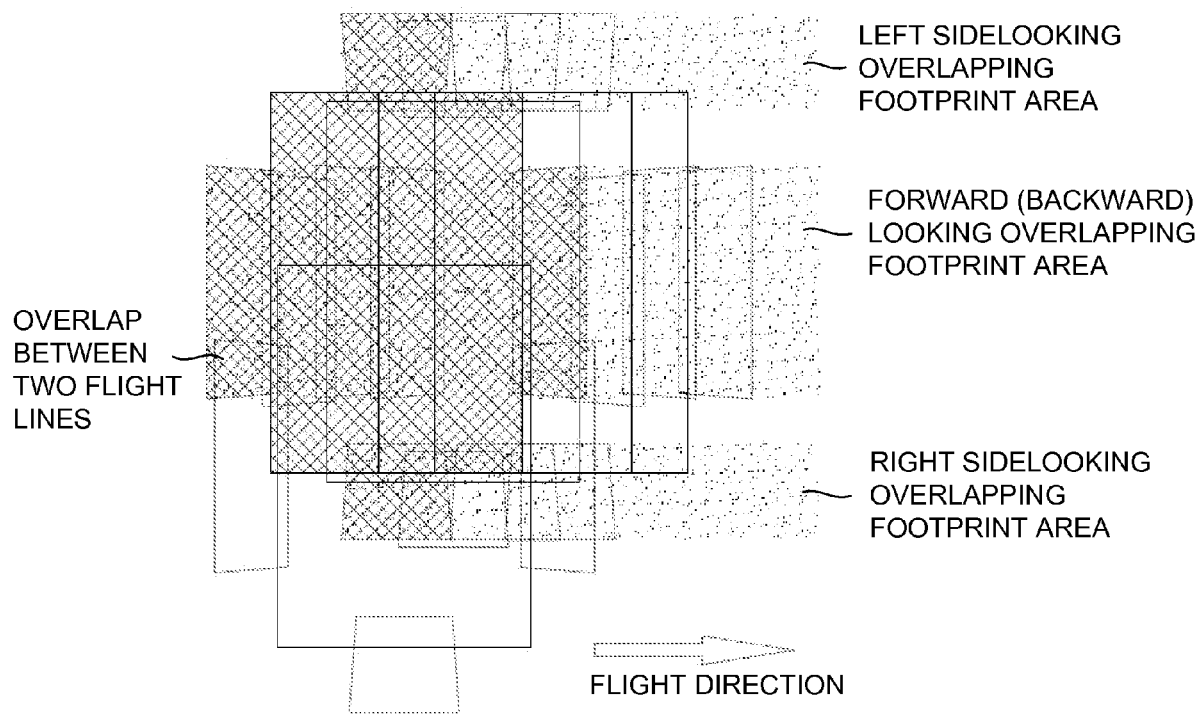
FIG. 14 is a schematic diagram illustrating a method for arranging multiple overlapping flight lines, and the overlapping individual images within each flight line, so that the entire terrain being photographed gets covered by overlapping images and can be observed stereoscopically, in accordance with an embodiment of the present invention.
Figure 15:
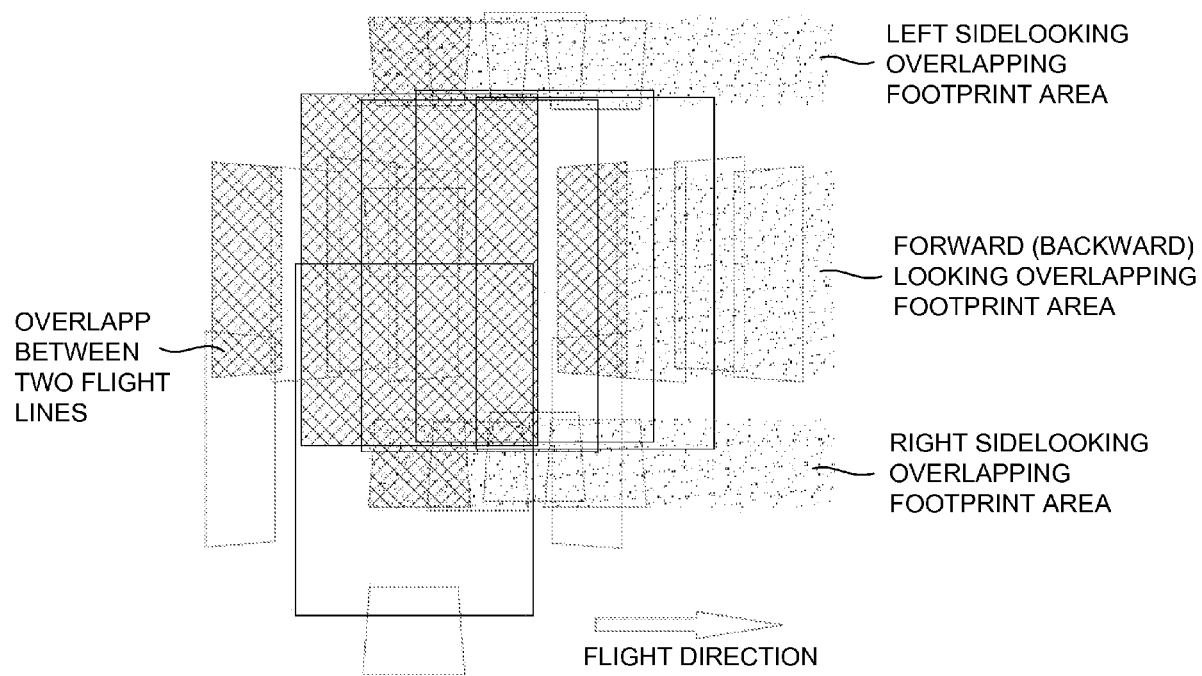
FIG. 15 is a schematic diagram illustrating a method for arranging multiple overlapping flight lines, and the overlapping individual images within each flight line, so that the entire terrain being photographed gets covered by overlapping images and can be observed stereoscopically, in accordance with an embodiment of the present invention.

FIGS. 14 and 15 illustrate a method for arranging multiple overlapping flight lines, and the overlapping individual images within each flight line, so that the entire object or terrain gets covered by overlapping images and can be observed stereoscopically. FIG. 14 illustrates the use of the exemplary method when the left and right acquired sub-images overlap with the primary image and FIG. 15 illustrates the use of the exemplary method when the left and right acquired sub-images do not overlap with the primary image. Within an individual flight line, it is necessary for images to be repeated sufficiently rapidly so that the left/right looking images overlap stereoscopically (i.e., so that each point on the ground appears in at least two sub-images) as shown. However, not the entire image assembly needs to be repeated for this purpose, but only the left/right looking sub-images need to be triggered to ensure that the outlying areas to the left and right are covered by multiple (and redundant) images. Since the fore/aft looking sub-images are smaller than the primary image format as well, an overlap is necessary for these sub-images to ensure the entire terrain gets covered. This fore/aft overlap may be achieved by a sufficiently narrow distance between adjacent flight lines. In one embodiment, the fore/aft sub-image overlap is achieved by a 60% sideward overlap between the primary images.

Figure 16:
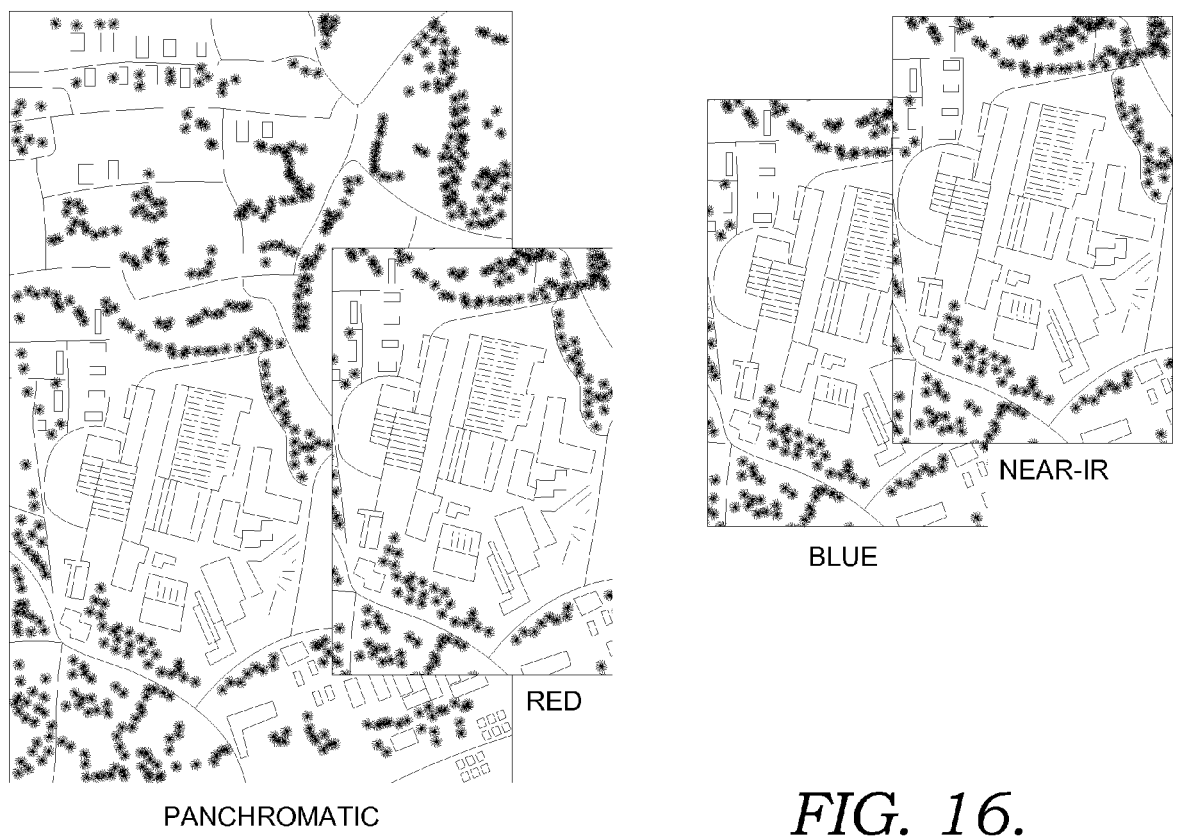
FIG. 16 is a schematic diagram illustrating color collection wherein a panchromatic or black and white image may be produced at a high resolution and three color channels may collect red, blue and near-infrared at a reduced resolution, in accordance with an embodiment of the present invention.

In accordance with embodiments of the present invention, color may be collected in separate color channels, each color by means of a single optical system. For instance, a panchromatic or black and white image may be produced at a high resolution and four color channels may collect red, green, blue and near-infrared at a reduced resolution. In other embodiments, a panchromatic or black and white image may be produced at a high resolution and three color channels may collect red, blue and near-infrared at a reduced resolution. This embodiment is illustrated in FIG. 16.

From the raw collected panchromatic-red-blue-near-infrared, the output red-green-blue and red-green-near-infrared false color results are computed utilizing an image classification algorithm. The image classification algorithm computes the green without having green collected through a separate color channel.

In one embodiment, the computed green (G') may be obtained from the observed red channel image (R), blue channel image (B), and panchromatic channel image (P) values utilizing the following algorithm:

$$G' = c_0 + c_1 * R + * c_2 * P + c_3 * B$$

wherein the coefficients $c_0$, $c_1$, $c_2$, and $c_3$ are determined in a laboratory calibration using known color targets and known light sources. Abandoning the green channel in the primary sensor allows for reduced volume, weight, and complexity relative to an embodiment wherein red, green, blue and near-infrared are all collected through separate channels.

In other embodiments, a substantially simultaneous collection of all colors based on a Bayer-pattern sensor may be utilized. This method of color collection and Bayer-pattern sensors are well known to those of ordinary skill in the art and, accordingly, are not further described herein.

It will be understood and appreciated by those of ordinary skill in the art that the four-channel color collection method, the computed-green color collection method and the substantially simultaneous color collection method may be utilized for any of the primary optical system and the secondary optical system(s) as desired. In one embodiment, color collection for the primary optical system is accomplished utilizing the computed-green method and color collection for the secondary optical system(s) is accomplished utilizing the substantially simultaneous collection of all colors based on a Bayer-pattern sensor. Additionally, the Bayer-pattern color from the secondary optical system(s) may be utilized to calibrate the color in the primary system, thereby eliminating the color distortions from the shutter limitations (more fully described below) of the primary image in the different lenses for each color channel. Any and all such color collection and/or calibration methods, and any combinations thereof, may be utilized within the scope of embodiments of the present invention.

In an embodiment wherein color collection for the primary optical system is accomplished utilizing the computed-green color collection method and color collection for the secondary optical system(s) is accomplished utilizing the substantially simultaneous collection of all colors based on a Bayer-pattern sensor, and operating the resulting imaging system at a fast image trigger repeat, each point on the ground will be covered on multiple primary images employing a first color collection regime and on multiple secondary images employing a second color regime. In such a case, as part of the photogrammetric analysis, multiple color values for red, green, blue (directly observed) and red-green-blue via Bayer pattern will be obtained. In addition, each of the color observations will derive a different incident angle (i.e., direction of observation). Such multiple values lead to redundancy that can be valuable in ensuring a complete and accurate image of the photographed terrain.

It should be noted that shutter speed may be variable, since a portion of the shutter function is mechanical. In embodiments hereof, actual time a shutter is open may be measured and any variation in the duration of the shutter's operation may then be compensated by software changing the brightness of the collected image. The changes may be computed based upon calibration tables. That is, measuring shutter variations permits calibration of color in the collected image and, accordingly, correction of the resulting colors can be computed. In this way, every image will show the same color for the same object, independent of the optical sub-system utilized to collect the photons.

As can be understood, embodiments of the present invention relate to apparatuses and methods for enhancing a "primary" large format, digital, macro-image with "secondary" image data. The secondary image data is collected utilizing one or more secondary optical systems having at least one electro-optical detector array (e.g., a CCD array) and a specific set of optical mirrors or optical prisms, arranged in such a way that the secondary optical systems extend the angular angle-of-view of the primary optical system and the resultant digital image, for instance, in the left and right and/or fore and aft directions. The primary image data and the secondary image data may be distinct and/or may include portions that overlap with one another. Further, the primary image data and the secondary image data may be collected at the same or different resolutions. The collected primary image data and secondary image data are utilized to generate a single output image.

Figure 17:
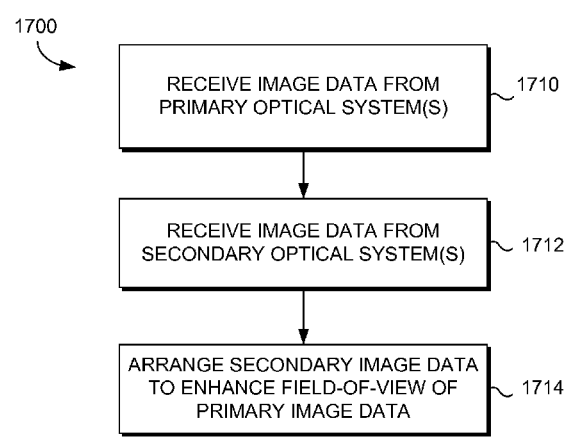
FIG. 17 is a flow diagram illustrating a method for enhancing large-format digital images, in accordance with an embodiment of the present invention.
Figure 18:
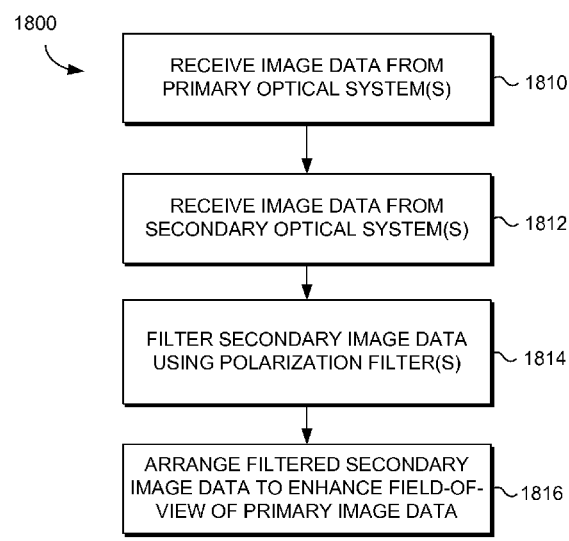
FIG. 18 is a flow diagram illustrating a method for generating large-format color digital images, in accordance with an embodiment of the present invention.
Figure 19:
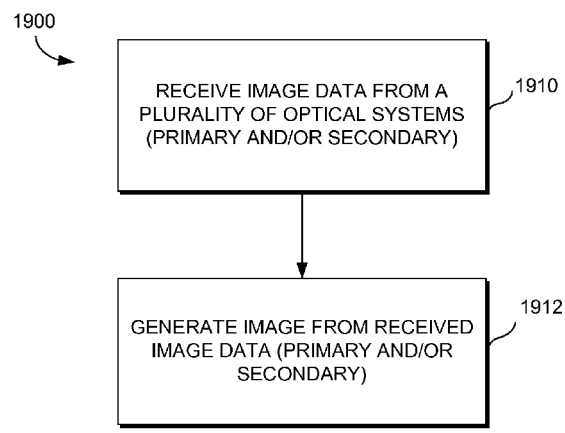
FIG. 19 is a flow diagram illustrating a method for generating large-format color digital images, in accordance with an embodiment of the present invention.
Figure 20:
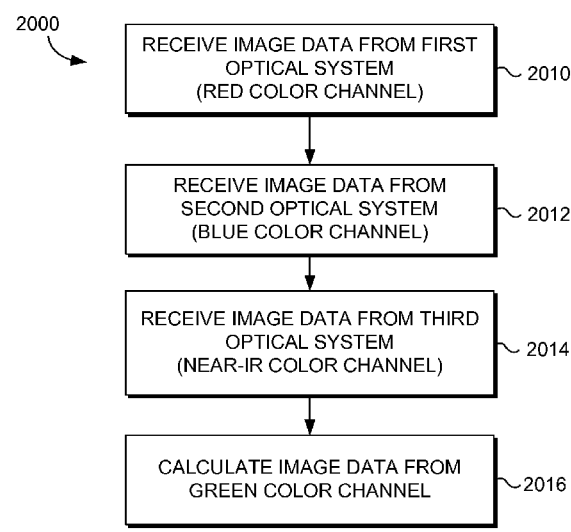
FIG. 20 is a flow diagram illustrating a method for generating large-format color digital images, in accordance with an embodiment of the present invention.

Accordingly, with reference to FIG. 17, it can be seen that embodiments of the present invention provide a method 1700 for enhancing large-format digital images. The method 1700 includes receiving primary image data 1710 from at least one primary optical system and receiving secondary image data 1712 from at least one secondary optical system. The secondary image data includes image data from two disparate regions received substantially simultaneously (i.e., within microseconds) by a single electro-optical detector array. The method further includes arranging 1714 the secondary image data with respect to the primary image data such that a angle-of-view of the primary image data is enhanced by the secondary image data (see FIGS. 1A and 1B).

Embodiments of the present invention further provide a method 1800 for enhancing large-format digital images. The method 1800 includes receiving primary image data 1810 from at least one primary optical system and receiving secondary image data 1812 from at least one secondary optical system. The secondary image data includes image data from two disparate regions received substantially simultaneously (i.e., within microseconds) by a single electro-optical detector array and the secondary image data is filtered 1814 through at least one polarization filter (1224 and 1226 of FIG. 12; 1324 and 1326 of FIG. 13). The method 1800 further includes arranging 1816 the secondary image data with respect to the primary image data such that a angle-of-view of the primary image is enhanced by the secondary image data.

Embodiments of the present invention further provide a method 1900 for generating large-format color digital images. The method 1900 includes receiving image data 1910 from a plurality of optical systems, each of the optical systems configured for collecting image data from a different color channel; and generating 1912 an image from the received image data. A quantity of colors represented in the generated image is greater than a quantity of optical systems from which image data is received and any color not received from one of the optical systems is calculated utilizing data associated with colors corresponding with each of the different color channels (see FIG. 16).

Still further, embodiments of the present invention provide a method 2000 for generating large-format color digital images. The method 2000 includes receiving image data from a first optical system 2010, the first optical system configured for collecting image data associated with a red color channel; receiving image data from a second optical system 2012, the second optical system configured for collecting image data associated with a blue color channel; receiving image data from a third optical system 2014, the third optical system configured for collecting image data associated with a near-infrared color channel; and calculating 2016 image data associated with a green color channel utilizing the image data received from each of the first, second and third optical systems.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. An apparatus for enhancing large-format digital images, the apparatus comprising:

one or more primary optical systems; and one or more secondary optical systems, each secondary optical system including one or more electro-optical detector arrays and at least two prisms, the at least two prisms being configured to collect light energy from disparate locations and project the respective collected light energy onto a common one of the one or more electro-optical detector arrays, wherein each of the one or more primary optical systems is configured to produce primary image content, and wherein each of the one or more secondary optical systems is configured to produce secondary image content, the secondary image content being arranged with respect to the primary image content such that an angle-of-view of the primary image content is extended by the secondary image content, and wherein the apparatus comprises a first secondary optical system configured to collect light energy for enhancing the primary image content in the left and right directions and a second secondary optical system configured to collect light energy for enhancing the primary image content in the fore and aft directions.

2. The apparatus of claim 1, wherein the one or more secondary optical systems further comprise a single optical lens through which the respective collected light energy is projected onto the common electro-optical detector array.

3. The apparatus of claim 2, wherein the single optical lens includes an optical axis associated therewith, and wherein the at least two prisms are arranged symmetrically about the optical axis.

4. The apparatus of claim 1, wherein the at least two prisms are configured to collect light energy from disparate locations and project the respective collected light energy onto substantially independent portions of the common electro-optical detector array.

5. The apparatus of claim 1, wherein the one or more primary optical systems and the one or more secondary optical systems are arranged in a single camera housing.

6. An apparatus for enhancing large-format digital images, the apparatus comprising:

one or more primary optical systems; and one or more secondary optical systems, each secondary optical system including one or more electro-optical detector arrays and at least one set of mirrors, at least two mirrors comprising the set being configured to collect light energy from disparate locations and project the respective collected light energy onto a common one of the one or more electro-optical detector arrays, wherein each of the one or more primary optical systems is configured to produce primary image content, and wherein each of the one or more secondary optical systems is configured to produce secondary image content, the secondary image content being arranged with respect to the primary image content such that an angle-of-view of the primary image content is extended by the secondary image content, and wherein the apparatus comprises a first secondary optical system configured to collect light energy for enhancing the primary image content in the left and right directions and a second secondary optical system configured to collect light energy for enhancing the primary image content in the fore and aft directions.

7. The apparatus of claim 6, wherein the at least one set of mirrors includes two pairs of mirrors, and wherein one mirror of each of the two pairs of mirrors is configured to collect light energy from disparate locations and project the respective collected light energy onto the common electro-optical detector array.

8. The apparatus of claim 6, wherein the one or more secondary optical systems further comprise a single optical lens through which the respective collected light energy is projected onto the common electro-optical detector array.

9. The apparatus of claim 8, wherein the single optical lens includes an optical axis associated therewith, and wherein the at least two mirrors comprising the at least one set of mirrors are arranged symmetrically about the at optical axis.

10. The apparatus of claim 6, wherein the at least two mirrors comprising the at least one set of mirrors are configured to collect light energy from disparate locations and project the respective collected light energy onto substantially independent portions of the common electro-optical detector array.

11. The apparatus of claim 6, wherein the one or more primary optical systems and the one or more secondary optical systems are arranged in a single camera housing.

12. An apparatus for enhancing large-format digital images, the apparatus comprising:

one or more primary optical systems;

one or more secondary optical systems, each secondary optical system including one or more electro-optical detector arrays and at least two prisms, the at least two prisms being configured to collect light energy from disparate locations and project the respective collected light energy onto a common one of the one or more electro-optical detector arrays; and at least one polarization filter configured to filter the light energy collected by each of the at least two prisms such that light energy from a first of the at least two prisms is configured to be projected onto a first region of the electro-optical detector array and light energy from a second of the at least two prisms is configured to be projected onto a second region of the electro-optical detector array, the first and second regions of the electro-optical detector assay being disparate from one another, wherein each of the one or more primary optical systems is configured to produce primary image content, and wherein each of the one or more secondary optical systems is configured to produce secondary image content, the secondary image content being arranged with respect to the primary image content such that an angle-of-view of the primary image content is extended by the secondary image content, and wherein the apparatus comprises a first secondary optical system configured to collect light energy for enhancing the primary image content in the left and right directions and a second secondary optical system configured to collect light energy for enhancing the primary image content in the fore and aft directions.

13. The apparatus of claim 12, wherein the one or more secondary optical systems further comprise a single optical lens through which the respective collected light energy is projected onto the common electro-optical detector array.

14. The apparatus of claim 13, wherein the single optical lens includes an optical axis associated therewith, and wherein the at least two prisms are arranged symmetrically about the optical axis.

15. The apparatus of claim 12, wherein the at least two prisms are configured to collect light energy from disparate locations and project the respective collected light energy onto substantially independent portions of the common electro-optical detector array.

16. The apparatus of claim 12, wherein the one or more primary optical systems and the one or more secondary optical systems are arranged in a single camera housing.

17. An apparatus for enhancing large-format digital images, the apparatus comprising:
one or more primary optical systems;
one or more secondary optical systems, each secondary optical system including one or more electro-optical detector arrays and at least one set of mirrors, at least two mirrors comprising the set being configured to collect light energy from disparate locations and project the respective collected light energy onto a common one of the one or more electro-optical detector arrays; and
at least one polarization filter configured to filter the light energy collected by each of at least two mirrors such that light energy from a first of the at least two mirrors is configured to be projected onto a first region of the electro-optical detector array and light energy from a second of the at least two mirrors is configured to be projected onto a second region of the electro-optical detector array, the first and second regions of the electro-optical detector array being disparate from one another,
wherein each of the one or more primary optical systems is configured to produce primary image content, and wherein each of the one or more secondary optical systems is configured to produce secondary image content, the secondary image content being arranged with respect to the primary image content such that an angle-of-view of the primary image content is extended by the secondary image content, and
wherein the apparatus comprises a first secondary optical system configured to collect light energy for enhancing the primary image content in the left and right directions and a second secondary optical system configured to collect light energy for enhancing the primary image content in the fore and aft directions.

18. The apparatus of claim 17, wherein the at least one set of mirrors includes two pairs of mirrors, and wherein one mirror of each of the two pairs of mirrors is configured to collect light energy from disparate locations and project the respective collected light energy onto the common electro-optical detector array.

19. The apparatus of claim 17, wherein the one or more secondary optical systems further comprise a single optical lens through which the respective collected light energy is projected onto the common electro-optical detector array.

20. The apparatus of claim 17, wherein the at least two mirrors comprising the at least one set of mirrors are configured to collect light energy from disparate locations and project the respective collected light energy onto substantially independent portions of the common electro-optical detector array.

* * * * *